United States Patent
Kost et al.

(10) Patent No.: US 9,178,415 B1
(45) Date of Patent: Nov. 3, 2015

(54) INDUCTOR OVER-CURRENT PROTECTION USING A VOLT-SECOND VALUE REPRESENTING AN INPUT VOLTAGE TO A SWITCHING POWER CONVERTER

(75) Inventors: Michael A. Kost, Cedar Park, TX (US); John L. Melanson, Austin, TX (US); Rahul Singh, Austin, TX (US); Mohit Sood, Austin, TX (US); Zhaohui He, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 435 days.

(21) Appl. No.: 12/751,949

(22) Filed: Mar. 31, 2010

Related U.S. Application Data

(60) Provisional application No. 61/251,784, filed on Oct. 15, 2009.

(51) Int. Cl.
- *H02M 1/00* (2007.01)
- *H02M 3/00* (2006.01)
- *H02M 3/156* (2006.01)

(52) U.S. Cl.
CPC . *H02M 3/00* (2013.01); *H02M 1/00* (2013.01); *H02M 3/156* (2013.01)

(58) Field of Classification Search
CPC .............. H02M 3/156; H02M 3/1588; H02M 2001/009; G05F 1/613
USPC .................................. 323/222, 223, 224, 287
See application file for complete search history.

(56) References Cited

U.S. PATENT DOCUMENTS

| | | |
|---|---|---|
| 3,316,495 A | 4/1967 | Sherer |
| 3,423,689 A | 1/1969 | Miller et al. |
| 3,586,988 A | 6/1971 | Weekes |

(Continued)

FOREIGN PATENT DOCUMENTS

| | | |
|---|---|---|
| DE | 19713814 | 10/1998 |
| EP | 0536535 A1 | 4/1993 |

(Continued)

OTHER PUBLICATIONS

Texas Instruments, Interleaving Continuous Conduction Mode PFC Controller, UCC28070, SLUS794C, Nov. 2007, revised Jun. 2009, Texas Instruments, Dallas TX.

(Continued)

*Primary Examiner* — Jue Zhang
*Assistant Examiner* — Lakaisha Jackson
(74) *Attorney, Agent, or Firm* — Terrile, Cannatti, Chambers & Holland, LLP; Kent B. Chambers

(57) ABSTRACT

A power control system includes a switching power converter and a controller. The controller is configured to detect an over-current condition of an inductor current in the switching power converter using at least one non-inductor-current signal. In at least one embodiment, the switching power converter does not have a resistor or resistor network to sense the inductor current. In at least one embodiment, the controller indirectly determines a state of the inductor current using at least one non-inductor-current signal. Potentially damaging inductor current values that are, for example, greater than a normal maximum value or at a value that causes a discontinuous conduction mode system to operate in continuous conduction mode represent exemplary inductor over-current conditions addressed by one embodiment of the power control system.

24 Claims, 10 Drawing Sheets

(56) References Cited

U.S. PATENT DOCUMENTS

| | | | |
|---|---|---|---|
| 3,725,804 A | 4/1973 | Langan | |
| 3,790,878 A | 2/1974 | Brokaw | |
| 4,409,476 A | 10/1983 | Lofgren et al. | |
| 4,415,960 A * | 11/1983 | Clark, Jr. | 363/21.17 |
| 4,523,128 A | 6/1985 | Stamm et al. | |
| 4,677,366 A | 6/1987 | Wilkinson et al. | |
| 4,683,529 A | 7/1987 | Bucher | |
| 4,737,658 A | 4/1988 | Kronmuller et al. | |
| 4,739,462 A * | 4/1988 | Farnsworth et al. | 363/21.16 |
| 4,937,728 A | 6/1990 | Leonardi | |
| 4,940,929 A | 7/1990 | Williams | |
| 4,977,366 A | 12/1990 | Powell | |
| 4,980,898 A | 12/1990 | Silvian | |
| 5,001,620 A | 3/1991 | Smith | |
| 5,003,454 A | 3/1991 | Bruning | |
| 5,055,746 A | 10/1991 | Hu et al. | |
| 5,109,185 A | 4/1992 | Ball | |
| 5,121,079 A | 6/1992 | Dargatz | |
| 5,173,643 A | 12/1992 | Sullivan et al. | |
| 5,264,780 A | 11/1993 | Bruer et al. | |
| 5,278,490 A | 1/1994 | Smedley | |
| 5,383,109 A | 1/1995 | Maksimovic et al. | |
| 5,424,932 A | 6/1995 | Inou et al. | |
| 5,430,635 A | 7/1995 | Liu | |
| 5,479,333 A | 12/1995 | McCambridge et al. | |
| 5,481,178 A | 1/1996 | Wilcox et al. | |
| 5,565,761 A | 10/1996 | Hwang | |
| 5,589,759 A | 12/1996 | Borgato et al. | |
| 5,638,265 A | 6/1997 | Gabor | |
| 5,691,890 A | 11/1997 | Hyde | |
| 5,747,977 A | 5/1998 | Hwang | |
| 5,757,635 A | 5/1998 | Seong | |
| 5,764,039 A | 6/1998 | Choi et al. | |
| 5,768,111 A | 6/1998 | Zaitsu | |
| 5,783,909 A | 7/1998 | Hochstein | |
| 5,798,635 A | 8/1998 | Hwang et al. | |
| 5,808,453 A * | 9/1998 | Lee et al. | 323/224 |
| 5,874,725 A | 2/1999 | Yamaguchi | |
| 5,912,812 A | 6/1999 | Moriarty, Jr. | |
| 5,946,206 A | 8/1999 | Shimizu et al. | |
| 5,960,207 A | 9/1999 | Brown | |
| 5,962,989 A | 10/1999 | Baker | |
| 5,994,885 A | 11/1999 | Wilcox et al. | |
| 6,037,754 A * | 3/2000 | Harper | 323/222 |
| 6,043,633 A | 3/2000 | Lev et al. | |
| 6,084,450 A | 7/2000 | Smith et al. | |
| 6,091,233 A | 7/2000 | Hwang | |
| 6,125,046 A | 9/2000 | Jang et al. | |
| 6,160,724 A | 12/2000 | Hemena et al. | |
| 6,181,114 B1 | 1/2001 | Hemena et al. | |
| 6,229,292 B1 | 5/2001 | Redl et al. | |
| 6,259,614 B1 | 7/2001 | Ribarich et al. | |
| 6,300,723 B1 | 10/2001 | Wang et al. | |
| 6,304,066 B1 | 10/2001 | Wilcox et al. | |
| 6,304,473 B1 | 10/2001 | Telefus | |
| 6,343,026 B1 | 1/2002 | Perry | |
| 6,356,040 B1 | 3/2002 | Preis et al. | |
| 6,369,525 B1 | 4/2002 | Chang et al. | |
| 6,407,514 B1 | 6/2002 | Glaser et al. | |
| 6,407,515 B1 | 6/2002 | Hesler | |
| 6,441,558 B1 | 8/2002 | Muthu et al. | |
| 6,445,600 B2 | 9/2002 | Ben-Yaakov | |
| 6,469,484 B2 | 10/2002 | L'Hermite et al. | |
| 6,495,964 B1 | 12/2002 | Muthu et al. | |
| 6,510,995 B2 | 1/2003 | Muthu et al. | |
| 6,531,854 B2 | 3/2003 | Hwang | |
| 6,580,258 B2 | 6/2003 | Wilcox et al. | |
| 6,583,550 B2 | 6/2003 | Iwasa | |
| 6,628,106 B1 | 9/2003 | Batarseh et al. | |
| 6,646,848 B2 | 11/2003 | Yoshida et al. | |
| 6,657,417 B1 | 12/2003 | Hwang | |
| 6,677,738 B1 * | 1/2004 | Hesse | 323/284 |
| 6,688,753 B2 | 2/2004 | Calon et al. | |
| 6,696,803 B2 | 2/2004 | Tao et al. | |
| 6,724,174 B1 | 4/2004 | Esteves et al. | |
| 6,727,832 B1 | 4/2004 | Melanson | |
| 6,737,845 B2 | 5/2004 | Hwang | |
| 6,753,661 B2 | 6/2004 | Muthu et al. | |
| 6,756,772 B2 | 6/2004 | McGinnis | |
| 6,768,655 B1 | 7/2004 | Yang et al. | |
| 6,781,351 B2 | 8/2004 | Mednik et al. | |
| 6,839,247 B1 | 1/2005 | Yang | |
| 6,882,552 B2 | 4/2005 | Telefus et al. | |
| 6,894,471 B2 | 5/2005 | Corva et al. | |
| 6,933,706 B2 | 8/2005 | Shih | |
| 6,940,733 B2 | 9/2005 | Schie et al. | |
| 6,944,034 B1 | 9/2005 | Shteynberg et al. | |
| 6,956,750 B1 | 10/2005 | Eason et al. | |
| 6,963,496 B2 | 11/2005 | Bimbaud | |
| 6,975,523 B2 | 12/2005 | Kim et al. | |
| 6,980,446 B2 | 12/2005 | Simada et al. | |
| 7,034,611 B2 | 4/2006 | Oswal et al. | |
| 7,072,191 B2 | 7/2006 | Nakao et al. | |
| 7,099,163 B1 | 8/2006 | Ying | |
| 7,126,288 B2 | 10/2006 | Ribarich et al. | |
| 7,161,816 B2 | 1/2007 | Shteynberg et al. | |
| 7,180,250 B1 | 2/2007 | Gannon | |
| 7,221,130 B2 | 5/2007 | Ribeiro et al. | |
| 7,233,135 B2 | 6/2007 | Noma et al. | |
| 7,246,919 B2 | 7/2007 | Porchia et al. | |
| 7,266,001 B1 | 9/2007 | Notohamiprodjo et al. | |
| 7,276,861 B1 | 10/2007 | Shteynberg et al. | |
| 7,288,902 B1 | 10/2007 | Melanson | |
| 7,292,013 B1 | 11/2007 | Chen et al. | |
| 7,295,452 B1 | 11/2007 | Liu | |
| 7,345,458 B2 | 3/2008 | Kanai et al. | |
| 7,375,476 B2 | 5/2008 | Walter et al. | |
| 7,388,764 B2 | 6/2008 | Huynh et al. | |
| 7,394,210 B2 | 7/2008 | Ashdown | |
| 7,411,379 B2 * | 8/2008 | Chu et al. | 323/284 |
| 7,511,437 B2 | 3/2009 | Lys et al. | |
| 7,538,499 B2 | 5/2009 | Ashdown | |
| 7,554,473 B2 | 6/2009 | Melanson | |
| 7,569,996 B2 | 8/2009 | Holmes et al. | |
| 7,583,136 B2 | 9/2009 | Pelly | |
| 7,606,532 B2 | 10/2009 | Wuidart | |
| 7,656,103 B2 | 2/2010 | Shteynberg et al. | |
| 7,667,986 B2 | 2/2010 | Artusi et al. | |
| 7,684,223 B2 | 3/2010 | Wei | |
| 7,710,047 B2 | 5/2010 | Shteynberg et al. | |
| 7,719,246 B2 | 5/2010 | Melanson | |
| 7,719,248 B1 | 5/2010 | Melanson | |
| 7,746,043 B2 | 6/2010 | Melanson | |
| 7,746,671 B2 | 6/2010 | Radecker et al. | |
| 7,750,738 B2 | 7/2010 | Bach | |
| 7,756,896 B1 | 7/2010 | Feingold | |
| 7,777,563 B2 | 8/2010 | Midya et al. | |
| 7,804,256 B2 | 9/2010 | Melanson | |
| 7,804,480 B2 | 9/2010 | Jeon et al. | |
| 7,834,553 B2 | 11/2010 | Hunt et al. | |
| 7,872,883 B1 | 1/2011 | Elbanhawy | |
| 7,894,216 B2 | 2/2011 | Melanson | |
| 8,008,898 B2 | 8/2011 | Melanson et al. | |
| 8,169,806 B2 | 5/2012 | Sims et al. | |
| 8,193,717 B2 | 6/2012 | Leiderman | |
| 8,222,772 B1 | 7/2012 | Vinciarelli | |
| 8,242,764 B2 | 8/2012 | Shimizu et al. | |
| 8,369,109 B2 | 2/2013 | Niedermeier et al. | |
| 8,441,210 B2 | 5/2013 | Shteynberg et al. | |
| 8,536,799 B1 | 9/2013 | Grisamore et al. | |
| 8,610,364 B2 | 12/2013 | Melanson et al. | |
| 2002/0065583 A1 | 5/2002 | Okada | |
| 2003/0090252 A1 | 5/2003 | Hazucha | |
| 2003/0111969 A1 | 6/2003 | Konishi et al. | |
| 2003/0160576 A1 | 8/2003 | Suzuki | |
| 2003/0174520 A1 | 9/2003 | Bimbaud | |
| 2003/0214821 A1 | 11/2003 | Giannopoulos et al. | |
| 2003/0223255 A1 | 12/2003 | Ben-Yaakov | |
| 2004/0004465 A1 | 1/2004 | McGinnis | |
| 2004/0037094 A1 | 2/2004 | Muegge et al. | |
| 2004/0046683 A1 | 3/2004 | Mitamura et al. | |
| 2004/0196672 A1 | 10/2004 | Amei | |
| 2005/0057237 A1 | 3/2005 | Clavel | |
| 2005/0168492 A1 | 8/2005 | Hekstra et al. | |

(56) References Cited

U.S. PATENT DOCUMENTS

| | | |
|---|---|---|
| 2005/0197952 A1 | 9/2005 | Shea et al. |
| 2005/0207190 A1 | 9/2005 | Gritter |
| 2005/0222881 A1 | 10/2005 | Booker |
| 2005/0231183 A1 | 10/2005 | Li et al. |
| 2005/0270813 A1 | 12/2005 | Zhang et al. |
| 2005/0275354 A1 | 12/2005 | Hausman |
| 2005/0275386 A1 | 12/2005 | Jepsen et al. |
| 2006/0002110 A1 | 1/2006 | Dowling |
| 2006/0013026 A1 | 1/2006 | Frank et al. |
| 2006/0022648 A1 | 2/2006 | Zeltser |
| 2006/0116898 A1 | 6/2006 | Peterson |
| 2006/0184414 A1 | 8/2006 | Pappas et al. |
| 2006/0214603 A1 | 9/2006 | Oh et al. |
| 2006/0238136 A1 | 10/2006 | Johnson, III et al. |
| 2006/0285365 A1 | 12/2006 | Huynh et al. |
| 2007/0024213 A1 | 2/2007 | Shteynberg et al. |
| 2007/0055564 A1 | 3/2007 | Fourman |
| 2007/0103949 A1 | 5/2007 | Tsuruya |
| 2007/0124615 A1 | 5/2007 | Orr |
| 2007/0126656 A1 | 6/2007 | Huang et al. |
| 2007/0285031 A1 | 12/2007 | Shteynberg et al. |
| 2008/0012502 A1 | 1/2008 | Lys |
| 2008/0018261 A1 | 1/2008 | Kastner |
| 2008/0027841 A1 | 1/2008 | Eder |
| 2008/0043504 A1 | 2/2008 | Ye |
| 2008/0054815 A1 | 3/2008 | Kotikalapoodi et al. |
| 2008/0062584 A1 | 3/2008 | Freitag et al. |
| 2008/0062586 A1 | 3/2008 | Apfel |
| 2008/0116818 A1 | 5/2008 | Shteynberg et al. |
| 2008/0117656 A1 | 5/2008 | Clarkin |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0175029 A1 | 7/2008 | Jung et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2008/0290846 A1* | 11/2008 | Kanouda et al. ............. 323/222 |
| 2008/0310194 A1 | 12/2008 | Huang et al. |
| 2009/0059632 A1 | 3/2009 | Li et al. |
| 2009/0067204 A1 | 3/2009 | Ye et al. |
| 2009/0070188 A1 | 3/2009 | Scott et al. |
| 2009/0108677 A1 | 4/2009 | Walter et al. |
| 2009/0174479 A1 | 7/2009 | Yan et al. |
| 2009/0184665 A1 | 7/2009 | Femo |
| 2009/0218960 A1 | 9/2009 | Lyons et al. |
| 2009/0295300 A1 | 12/2009 | King |
| 2010/0128501 A1 | 5/2010 | Huang et al. |
| 2010/0141317 A1 | 6/2010 | Szajnowski |
| 2010/0187914 A1* | 7/2010 | Rada et al. ................ 307/105 |
| 2010/0238689 A1 | 9/2010 | Fei et al. |
| 2010/0244793 A1 | 9/2010 | Caldwell |
| 2011/0110132 A1* | 5/2011 | Rausch et al. ............. 363/124 |
| 2011/0199793 A1 | 8/2011 | Kuang et al. |
| 2011/0276938 A1 | 11/2011 | Perry et al. |
| 2011/0291583 A1 | 12/2011 | Shen |
| 2011/0309760 A1 | 12/2011 | Beland et al. |
| 2012/0146540 A1 | 6/2012 | Khayat et al. |
| 2012/0187997 A1 | 7/2012 | Liao et al. |
| 2012/0248998 A1 | 10/2012 | Yoshinaga |
| 2012/0320640 A1 | 12/2012 | Baurle et al. |
| 2013/0181635 A1 | 7/2013 | Ling |
| 2014/0218978 A1 | 8/2014 | Heuken et al. |

FOREIGN PATENT DOCUMENTS

| | | |
|---|---|---|
| EP | 0632679 | 1/1995 |
| EP | 0636889 A1 | 1/1995 |
| EP | 0838791 | 4/1998 |
| EP | 1213823 A2 | 6/2002 |
| EP | 1289107 A3 | 8/2002 |
| EP | 1460775 | 9/2004 |
| EP | 1962263 A2 | 8/2008 |
| EP | 2204905 A1 | 7/2010 |
| EP | 2232949 | 9/2010 |
| EP | 2257124 A1 | 12/2010 |
| GB | 2069269 A | 8/1981 |
| JP | 2008053181 A | 3/2006 |
| WO | WO9725836 | 7/1997 |
| WO | 01/15316 A1 | 1/2001 |
| WO | 01/84697 A2 | 11/2001 |
| WO | 02/15386 A2 | 2/2002 |
| WO | 2004/051834 A1 | 6/2004 |
| WO | WO2006013557 | 2/2006 |
| WO | 2006/022107 A1 | 3/2006 |
| WO | 2007016373 A2 | 2/2007 |
| WO | 2008/004008 A2 | 1/2008 |
| WO | WO2008072160 | 6/2008 |
| WO | WO2008152838 | 12/2008 |
| WO | 2010011971 A1 | 1/2010 |
| WO | 2010065598 A2 | 6/2010 |
| WO | 2011008635 A1 | 1/2011 |

OTHER PUBLICATIONS

Mamano, Bob, "Current Sensing Solutions for Power Supply Designers", Unitrode Seminar Notes SEM1200, 1999.
http://toolbarpdf.com/docs/functions-and-features-of-inverters.html printed on Jan. 20, 2011.
ST Datasheet L6562, Transition-Mode PFC Controller, 2005, STMicroelectronics, Geneva, Switzerland.
Maksimovic, Regan Zane and Robert Erickson, Impact of Digital Control in Power Electronics, Proceedings of 2004 International Symposium on Power Semiconductor Devices & Ics, Kitakyushu, , Apr. 5, 2010, Colorado Power Electronics Center, ECE Department, University of Colorado, Boulder, CO.
STMicroelectronics, Transition-Mode PFC Controller, L6562, Nov. 2005, Rev. 8.
Cheng, Hung L., et al, A Novel Single-Stage High-Power-Factor Electronic Ballast with Symmetrical Topology Power Electronics and Motion Control Conference, 2006. IPEMC 2006. CES/IEEE 5th International, Aug. 14-16, 2006, vol. 50, No. 4, pp. 759-766, Nt. Ilan Univ., Taiwan.
Fairchild Semiconductor, Theory and Application of the ML4821 Average Current Mode PFC Controller, Fairchild Semiconductor Application Note 42030, Rev. 1.0, Oct. 25, 2000, pp. 1-19, San Jose, California, USA.
Infineon Technologies AG, Standalone Power Factor Correction (PFC) Controller in Continuous Conduction Mode (CCM), Infineon Power Management and Supply, CCM-PFC, ICE2PCS01G, Version 2.1, Feb. 6, 2007, pp. 1-22, Munchen, Germany.
International Rectifier, PFC One Cycle Control PFC IC, International Rectifier, Data Sheet No. PD60230 rev. C, IR1150(S)(PbF), Feb. 5, 2007, pp. 1-16, El Segundo, California, USA.
International Rectifier, IRAC1150-300W Demo Board, User's Guide, Rev. 3.0, International Rectifier Computing and Communications SBU—AC-DC Application Group, pp. 1-18, Aug. 2, 2005, El Segundo, CA USA.
Lai, Z., et al, A Family of Power-Factor-Correction Controller, Applied Power Electronics Conference and Exposition, 1997. APEC '97 Conference Proceedings 1997, Twelfth Annual, vol. 1, pp. 66-73, Feb. 23-27, 1997, Irvine, California, USA.
Lee, P., et al, Steady-State Analysis of an Interleaved Boost Converter with Coupled Inductors, IEEE Transaction on Industrial Electronics, vol. 47, No. 4, Aug. 2000, pp. 787-795, Hung Hom, Kowloon, Hong Kong, China.
Ben-Yaakov, et al, The Dynamics of a PWM Boost Converter with Resistive Input, IEEE Transactions on Industrial Electronics, vol. 46, No. 3, Jun. 1999, pp. 1-8, Negev, Beer-Sheva, Israel.
ON Semiconductor, Cost Effective Power Factor Controller, NCP1606, pp. 1-22, Mar. 2007, Rev. 3, Denver, Colorado, USA.
Fairchild Semiconductor, 500W Power-Factor-Corrected (PFC) Converter Design with FAN4810, Application Note 6004, Rev. 1.0.1, pp. 1-10, Oct. 31, 2003, San Jose, California, USA.

(56) References Cited

OTHER PUBLICATIONS

Fairchild Semiconductor, Power Factor Correction (PFC) Basics, Application Note 42047, Rev. 0.9.0, pp. 1-11, Aug. 19, 2004, San Jose, California, USA.
Fairchild Semiconductor, Design of Power Factor Correction Circuit Using FAN7527B, Application Note AN4121, Rev. 1.0.1, pp. 1-22, May 30, 2002, San Jose, California, USA.
Fairchild Semiconductor, Low Start-Up Current PFC/PWM Controller Combos FAN4800, Rev. 1.0.5, Nov. 2005, San Jose, California, USA.
Fairchild Semiconductor, ZVS Average Current PFC Controller FAN 4822, Rev. 1.0.1, pp. 1-10, Aug. 10, 2001, San Jose, California, USA.
Philips Semiconductor, 90W Resonant SMPS with TEA1610 Swing Chip, Application Note AN99011, pp. 1-28, Sep. 14, 1999, The Netherlands.
ON Semiconductor, Enhanced, High Voltage and Efficient Standby Mode, Power Factor Controller, NCP1605, pp. 1-32, Feb. 2007, Revised 1, Denver, Colorado, USA.
ON Semiconductor, Power Factor Controller for Compact and Robust, Continuous Conduction Mode Pre-Converters, NCP1654, pp. 1-10, Mar. 2007, Rev. PO, Denver, Colorado, USA.
Fairchild Semiconductor, Simple Ballast Controller, KA7541, Rev. 1.0.3, pp. 1-14, Sep. 27, 2001, San Jose, California, USA.
Fairchild Semiconductor, Power Factor Controller, ML4812, Rev. 1.0.4, pp. 1-18, May 31, 2001, San Jose, California, USA.
Prodic, et al, Digital Controller for High-Frequency Rectifiers with Power Factor Correction Suitable for On-Chip Implementation, Power Conversion Conference—Nagoya, 2007. PCC 2007, Apr. 2-5, 2007, pp. 1527-1531, Toronto, Canada.
Freescale Semiconductor, Dimmable Light Ballast with Power Factor Correction, Designer Reference Manual, M68HC08 Microcontrollers, DRM067, Rev. 1, pp. 1-72, Dec. 2005, Chandler, Arizona, USA.
Freescale Semiconductor, Design of Indirect Power Factor Correction Using 56F800/E, Freescale Semiconductor Application Note, AN1965, Rev. 1, pp. 1-20, Jul. 2005, Chandler, Arizona, USA.
Freescale Semiconductor, Implementing PFC Average Current Mode Control using the MC9S12E128, Application Note AN3052, Addendum to Reference Design Manual DRM064, Rev. 0, pp. 1-8, Nov. 2005, Chandler, Arizona, USA.
Madigan, et al, Integrated High-Quality Rectifier-Regulators, Industrial Electronics, IEEE Transactions on Industrial Electronics, vol. 46, Issue 4, pp. 749-758, Aug. 1999, Cary, North Carolina, USA.
Renesas, Renesas Technology Releases Industry's First Critical-Conduction Mode Power Factor Correction Control IC Implementing Interleaved Operations, R2A20112, pp. 1-4, Dec. 18, 2006, Tokyo, Japan.
Miwa, et al, High Efficiency Power Factor Correction Using Interleaving Techniques, Applied Power Electronics Conference and Exposition, 1992, APEC '92. Conference Proceedings 1992, Seventh Annual, Feb. 23-27, 1992, pp. 557-568, MIT, Cambridge, Massachusetts, USA.
Noon, Jim, High Performance Power Factor Preregulator UC3855A/B, Texas Instruments, Application Report SLUA146A, pp. 1-35, May 1996—Revised Apr. 2004, Dallas, Texas, USA.
NXP Semiconductors, TEA1750, Greenchip III SMPS Control IC Product Data Sheet, Rev. 01, pp. 1-29, Apr. 6, 2007, Eindhoven, The Netherlands.
Turchi, Joel, Power Factor Correction Stages in Critical Conduction Mode, On Semiconductor, Application Note AND8123D, pp. 1-20, Sep. 2003, Rev. 1, Denver, Colorado, USA.
ON Semiconductor, GreenLine Compact Power Factor Controller: Innovative Circuit for Cost Effective Solutions, MC33260. Semiconductor Components Industries, pp. 1-22, Sep. 2005, Rev. 9, Denver, Colorado, USA.
Fairchild Semiconductor, Theory and Application of the ML4821 Average Current Mode PFC Controller, Application Note 42030, Rev. 1.0 , Oct. 25, 2000, pp. 1-19, San Jose, California, USA.

Fairchild Semiconductor, 500W Power-Factor-Corrected (PFC) Converter Design with FAN4810, Application Note 6004, Oct. 31, 2003, pp. 1-10, San Jose, California, USA.
Garcia, et al, High Efficiency PFC Converter to Meet EN61000-3-2 and A14, pp. 1-6, Mar. 2, 2002, Universidad Politecnica de Madrid, E.T.S.I.I, Di. de Ingenieria Electronica,Madrid, Spain.
Renesas, Renesas Technology Releases Industry's First Critical-Conduction-Mode Power Factor Correction Control IC Implementing Interleaved Operations, R2A20112, Dec. 18, 2006, pp. 1-4, Tokyo, Japan.
Renesas, PFC Control IC R2A20111 Evaluation Board, Application Note R2A20111 EVB, Feb. 2007, pp. 1-40,Rev. 1.0, Tokyo, Japan.
Renesas, Power Factor Correction Controller IC, HA16174P/FP, Rev. 1.0, Jan. 6, 2006, pp. 1-38, Tokyo, Japan.
Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.
STMicroelectronics, Transition-Mode PFC Controller, Datasheet L6562, Rev. 8, Nov. 2005, pp. 1-16, Geneva, Switzerland.
Texas Instruments, UCC281019, 8-Pin Continuous Conduction Mode (CCM) PFC Controller, SLU828B, Revised Apr. 2009, pp. 1-48, Dallas, Texas, USA.
STMicroelectronics, Advanced Transition-Mode PFC Controller L6563 and L6563A, Mar. 2007, pp. 1-40, Geneva Switzerland.
STMicroelectronics, CFL/TL Ballast Driver Preheat and Dimming, L6574, Sep. 2003, pp. 1-10, Geneva Switzerland.
STMicroelectronics, Power Factor Corrector, L6561, Rev. 16, Jun. 2004, pp. 1-13, Geneva, Switzerland.
Texas Instruments, Avoiding Audible Noise at Light Loads When Using Leading Edge Triggered PFC Converters, Application Report SLUA309A, Mar. 2004—Revised Sep. 2004, pp. 1-4, Dallas, TX, USA.
Texas Instruments, Startup Current Transient of the Leading Edge Triggered PFC Controllers, Application Report SLUA321, Jul. 2004, pp. 1-4, Dallas, TX, USA.
Texas Instruments, Current Sense Transformer Evaluation UCC3817, Application Report SLUA308, Feb. 2004, pp. 1-3, Dallas, TX, USA.
Texas Instruments, 350-W, Two-Phase Interleaved PFC Pre-regulator Design Review, Application Report SLUA369B, Feb. 2005—Revised Mar. 2007, pp. 1-22, Dallas, TX, USA.
Texas Instruments, Average Current Mode Controlled Power Factor Correction Converter using TMS320LF2407A, Application Report SPRA902A, Jul. 2005, pp. 1-15, Dallas, TX, USA.
Texas Instruments, Transition Mode PFC Controller, UCC28050, UCC28051, UCC38050, UCC38051, Application Note SLUS515D, Sep. 2002—Revised Jul. 2005, pp. 1-28, Dallas TX, USA.
Texas Instruments, Interleaving Continuous Conduction Mode PFC Controller, UCC28070, SLUS794C, Nov. 2007—Revised Jun. 2009, pp. 1-45, Dallas, TX, USA.
Texas Instruments, BiCMOS Power Factor Preregulator Evaluation Board UCC3817, User's Guide, SLUU077C, Sep. 2000—Revised Nov. 2002, pp. 1-10, Dallas, TX, USA.
ON Semiconductor, Four Key Steps to Design a Continuous Conduction Mode PFC Stage Using the NCP1653, Application Note AND8184/D, Nov. 2004, pp. 1-8, Phoenix, AZ, USA.
Unitrode, BiCMOS Power Factor Preregulator, Texas Instruments, UCC2817, UCC2818, UCC3817, UCC3818, SLUS3951, Feb. 2000—Revised Feb. 2006, pp. 1-25, Dallas, TX, USA.
Unitrode, Optimizing Performance in UC 3854 Power Factor Correction Applications, Design Note DN-39E, Nov. 1994, revised 1999, pp. 1-6, Merrimack, ME, USA.
Unitrode, High Power-Factor Preregulator, UC1852, UC2852, UC3852, Feb. 5, 2007, pp. 1-8, Merrimack, ME, USA.
Unitrode, UC3854A/B and UC3855A/B Provide Power Limiting with Sinusoidal Input Current for PFC Front Ends, SLUA196A, Design Note DN-66, Jun. 1995—Revised Nov. 2001, pp. 1-6, Merrimack, ME, USA.
Unitrode, Programmable Output Power Factor Preregulator, UCC2819, UCC3819, SLUS482B, Apr. 2001—Revised Dec. 2004, pp. 1-16, Merrimack, ME, USA.

(56) References Cited

OTHER PUBLICATIONS

Yao, et al, Soft Switching Circuit for Interleaved Boost Converters, IEEE Transactions on Power Electronics, vol. 22, No. 1, Jan. 2007, pp. 80-86, Zhejiang Univ., Hangzhou.

Zhang, et al, A New Duty Cycle Control Strategy for Power Factor Correction and FPGA Implementation, IEEE Transactions on Power Electronics, vol. 21, No. 6, Nov. 2006, pp. 1745-1753, Ontario, Canada.

Zhou, et al, Novel Sampling Algorithm for DSP Controlled 2kW PFC Converter, IEEE Transactions on Power Electronics, vol. 16, No. 2, Mar. 2001, pp. 217-222, Zhejiang Univ., Hangzhou.

Su, et al, Ultra Fast Fixed-Frequency Hysteretic Buck Converter with Maximum Charging Current Control and Adaptive Delay Compensation for DVS Applications, IEEE Journal of Solid-State Circuits, vol. 43, No. 4, Apr. 2008, pp. 815-822, Hong Kong University of Science and Technology, Hong Kong, China.

Wong, et al, "Steady State Analysis of Hysteretic Control Buck Converters", 2008 13th International Power Electronics and Motion Control Conference (EPE-PEMC 2008), pp. 400-404, 2008, National Semiconductor Corporation, Power Management Design Center, Hong Kong, China.

Zhao, et al, Steady-State and Dynamic Analysis of a Buck Converter Using a Hysteretic PWM Control, 2004 35th Annual IEEE Power Electronics Specialists Conference, pp. 3654-3658, Department of Electrical & Electronic Engineering, Oita University, 2004, Oita, Japan.

ST Microelectronics, AN993, Application Note, Electronic Ballast Using L6574 & L6561.

Unitrode Products From Texas Instruments, BiCMOS Power Factor SLUS3951.

Balogh, Laszlo, et al, Power-Factor Correction with Interleaved Boost Converters in Continuous-Inductor-Current Mode, 1993, pp. 168-174, IEEE, Switzerland.

Garcia, O., et al, High Efficiency PFC Converter to Meet EN61000-3-2 and A14, Industrial Electronics, 2002. ISIE 2002. Proceedings of the 2002 IEEE International Symposium, vol. 3, pp. 975-980, Div. de Ingenieria Electronica, Univ. Politecnica de Madrid, Spain.

Lu, et al, Bridgeless PFC Implementation Using One Cycle Control Technique, International Rectifier, 2005, pp. 1-6, Blacksburg, Virginia, USA.

Brown, et al, PFC Converter Design with IR1150 One Cycle Control IC, International Rectifier, Jun. 2005, Application Note, AN-1077, pp. 1-18, El Segundo, California, USA.

Linear Technology, Single Switch PWM Controller with Auxiliary Boost Converter, Data Sheet LT1950, Rev. A, Linear Technology Corporation, pp. 1-20, 2003, Milpitas, California, USA.

Linear Technology, Power Factor Controller, Rev. D, Data Sheet LT1248, Linear Technology Corporation, pp. 1-12, 1993, Milpitas, California, USA.

Supertex, Inc., HV9931 Unity Power Factor LED Lamp Driver, Supertex, Inc., Application Note AN-H52, 2007, pp. 1-20, Sunnyvale, California, USA.

Erickson, Robert W., et al, Fundamentals of Power Electronics, Second Edition, Chapter 6, pp. 131-184, 2001, Boulder, Colorado, USA.

Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.

Hirota, et al, Analysis of Single Switch Delta-Sigma Modulated Pulse Space Modulation PFC Converter Effectively Using Switching Power Device, Power Electronics Specialists Conference, 2002. peso 02. 2002 IEEE 33rd Annual, vol. 2, pp. 682-686, Hyogo, Japan.

ST Microelectronics, AN993 Application Note, Electronic Ballast with PFC Using L6574 and L6561, pp. 1-20, 2004, Geneva, Switzerland.

* cited by examiner

INDUCTOR OVER-CURRENT PROTECTION USING A VOLT-SECOND VALUE REPRESENTING AN INPUT VOLTAGE TO A SWITCHING POWER CONVERTER

CROSS-REFERENCE TO RELATED APPLICATION

This application claims the benefit under 35 U.S.C. §119 (e) and 37 C.F.R. §1.78 of U.S. Provisional Application No. 61/251,784, filed Oct. 15, 2009, and entitled "Volt-Second Protection"," which is incorporated by reference in its entirety.

BACKGROUND OF THE INVENTION

1. Field of the Invention

The present invention relates in general to the field of signal processing, and, more specifically, to a system and method that includes inductor over-current protection in a switching power converter based on one or more non-inductor-current signals.

2. Description of the Related Art

Switching power converters convert supplied power into a form and magnitude that is useful for numerous electronic products including cellular telephones, computing devices, personal digital assistants, televisions, other switching power converters, and lamps, such as light emitting diode and gas discharge type lamps. For example, alternating current (AC)-to-direct current (DC) switching power converters are often configured to convert AC voltages from an AC voltage source into DC voltages. DC-to-DC switching power converters are often configured to convert DC voltages of one level from a DC voltage source into DC voltages of another level. Switching power converters are available in many types, such as boost-type, buck-type, boost-buck type, and Cúk type converters. The switching power converters are controlled by a controller that controls one or more power regulation switches. Switching of the power regulation switch controls the link voltage of the switching power converter and, in some embodiments, also controls power factor correction.

FIG. 1 represents a power control system 100, which includes a switching power converter 102 and a controller 110. Voltage source 104 supplies an alternating current (AC) input voltage $V_{IN}$ to a full, diode bridge rectifier 106. The rectifier 106 can be separate from the switching power converter 102, as shown, or part of the switching power converter 102. The voltage source 104 is, for example, a public utility, and the AC input voltage $V_{IN}$ is, for example, a 60 Hz/110 V line voltage in the United States of America or a 50 Hz/220 V line voltage in Europe. The rectifier 106 rectifies the input voltage $V_{IN}$ and supplies a rectified, time-varying, line input voltage $V_X$ to the switching power converter.

The switching power converter includes a power regulation switch 108, and the power control system 100 also includes a controller 110 to control power regulation switch 108. Switch 108 is an n-channel, metal oxide semiconductor field effect transistor (FET). In other embodiments, switch 108 is a bipolar junction transistor or an insulated gate bipolar junction transistor. Controller 110 generates a gate drive control signal $CS_0$ to control the switching period and "ON" (conduction) time of switch 108. Controlling the switching period and "ON" time of switch 108 provides power factor correction and regulates the link voltage $V_{LINK}$. Switch 108 regulates the transfer of energy from the line input voltage $V_X$ through inductor 112 to link capacitor 114. The inductor current $i_L$ ramps 'up' when switch 108 is "ON", and diode 116 prevents link capacitor 114 from discharging through switch 108. When switch 108 is OFF, diode 116 is forward biased, and the inductor current $i_L$ ramps down as the current $i_L$ recharges link capacitor 114. The time period during which the inductor current $i_L$ ramps down is referred to as an "inductor flyback period". The switching power converter 102 also includes a low pass, electromagnetic interference (EMI) filter 118 to filter any high frequency signals from the line input voltage $V_X$. The EMI filter 118 consists of inductor 120 and capacitor 122.

Link capacitor 114 supplies stored energy to load 117. Load 117 can be any type of load such as another switching power converter, light source, or any other electronic device. The capacitance of link capacitor 114 is sufficiently large so as to maintain a substantially constant output, link voltage $V_{LINK}$, as established by controller 110. The link voltage $V_{LINK}$ remains substantially constant during constant load conditions. However, as load conditions change, the link voltage $V_{LINK}$ changes. The controller 110 responds to the changes in link voltage $V_{LINK}$ and adjusts the control signal $CS_0$ to restore a substantially constant link voltage $V_{LINK}$ as quickly as possible.

Controller 110 maintains control of the inductor current $i_L$ to ensure safe operation of switching power converter 102. Numerous fault conditions can occur that can cause the inductor current $i_L$ to exceed normal operating limitations. For example, ringing in the EMI filter 118 can cause the inductor current $i_L$ to exceed normal operating conditions. "Ringing" refers to oscillations of a signal around a nominal value of the signal. Ringing can be associated with sharp (i.e. high frequency component) transitions. To maintain control of the inductor current $i_L$, switching power converter 102 includes an inductor current sense resistor 124 connected in series with switch 108 to sense the inductor current $i_L$. The inductor current $i_L$ causes an inductor current signal in the form of inductor current sense voltage $V_{iL\_sense}$ to develop across inductor sense resistor 124. The inductor current sense voltage $V_{iL\_sense}$ is directly proportional to the inductor current $i_L$ when switch 108 is ON. Controller 110 monitors the inductor current sense voltage $V_{iL\_sense}$ to determine if inductor current $i_L$ exceeds typical operating limitations and responds to an atypically large inductor current $i_L$ by deasserting the control signal $CS_0$. Deasserting control signal $CS_0$ causes switch 108 to turn OFF, thereby attempting to prevent any further increase of the inductor current $i_L$.

Controller 110 controls switch 108 and, thus, controls power factor correction and regulates output power of the switching power converter 102. The goal of power factor correction technology is to make the switching power converter 102 appear resistive to the voltage source 104. Thus, controller 110 attempts to control the inductor current $i_L$ so that the average inductor current $i_L$ is linearly and directly related to the line input voltage $V_X$. Prodić, *Compensator Design and Stability Assessment for Fast Voltage Loops of Power Factor Correction Rectifiers*, IEEE Transactions on Power Electronics, Vol. 22, No. 5, September 2007, pp. 1719-1729 (referred to herein as "Prodić"), describes an example of controller 110. The controller 110 supplies a pulse width modulated (PWM) control signal $CS_0$ to control the conductivity of switch 108. The values of the pulse width and duty cycle of control signal $CS_0$ generally depend on feedback signals, namely, the line input voltage $V_X$, the link voltage $V_{LINK}$, and inductor current sense voltage $V_{iL\_sense}$.

FIG. 2 depicts inductor current $i_L$ and control signal $CS_0$ timing diagrams 200 during a period TT of switch control signal $CS_0$. Referring to FIGS. 1 and 2, for the time period $t_1$, controller 110 generates a pulse 202 of control signal $CS_0$ that causes switch 108 to conduct. When switch 108 conducts, the inductor current $i_L$ ramps up. The time period $t_1$ is the pulse width (PW) of control signal $CS_0$ for period TT of control signal $CS_0$. When the pulse of control signal $CS_0$ ends at the end of time period $t_1$, the inductor current $i_L$ begins to ramp down. The inductor current $i_L$ ramps down to 0 at the end of time period $t_2$. Time period $t_2$ is an inductor flyback period. The time period $t_3$ represents the elapsed time between (i) the inductor flyback period for period TT and (ii) the next pulse of control signal $CS_0$. To operate switching power converter 102 in discontinuous current mode (DCM), controller 110 ensures that the time period $t_3$ is non-zero. In other words, to operate in DCM, the inductor current $i_L$ must ramp down to 0 prior to the next pulse 204 of control signal $CS_0$.

To monitor the inductor current $i_L$ when energy is being transferred to the inductor 112 during time $t_2$ (FIG. 2), controller 110 monitors inductor current sense voltage inductor current sense voltage $V_{iL\_sense}$. The inductor current sense voltage $V_{iL\_sense}$ provides a direct one-to-one tracking of the inductor current $i_L$ when energy is being transferred to the inductor 112. To ensure that switching power converter 102 operates in DCM, switching power converter 102 includes a secondary coil 126 that develops a voltage signal $V_L$ corresponding to the inductor current $i_L$. Comparator 128 determines if voltage signal $V_L$ is greater than 0V. The comparator 128 generates an output signal FLYBACK. When signal FLYBACK is a logical 0, switching power converter 102 is in an inductor flyback period. When signal FLYBACK is a logical 1, switching power converter 102 is not in an inductor flyback period. A logical "1" is, for example, a 3.3V. Thus, in one embodiment, when signal FLYBACK is a logical 1, a 3.3V signal is applied to terminal 130 of controller 110. Controller 110 receives the signal FLYBACK through terminal 130 and uses the signal FLYBACK to ensure that control signal $CS_0$ does not begin a new pulse 204 until the inductor flyback period is over. Thus, controller 110 is able to maintain switching power converter 102 in DCM.

Sensing the inductor current $i_L$ across inductor current sense resistor 124 results in power losses equal to $i_L^2 R$, and "R" is the resistance value of inductor current sense resistor 124. Generally the value of "R" is chosen so that the losses associated with sensing the inductor current across inductor current sense resistor 124 are at least approximately 0.5-1% loss in total efficiency. However, when operating at above 90% efficiency, a 1% energy loss represents at least 10% of the losses. Additionally, controller 110 includes two extra terminals 130 and 132 to respectively sense inductor current sense voltage $V_{iL\_sense}$ and signal FLYBACK. Extra terminals for an integrated circuit embodiment of controller 110 add extra cost to controller 110.

SUMMARY OF THE INVENTION

In one embodiment of the present invention, an apparatus includes a controller. The controller is configured to detect an over-current condition of an inductor current in a switching power converter using at least one non-inductor-current signal.

In another embodiment of the present invention, an apparatus includes a controller. The controller is configured to detect an over-current condition of an inductor current in a switching power converter without using a signal generated using a resistor in series with a power regulation switch of the switching power converter.

In one embodiment of the present invention, a method includes detecting an over-current condition of an inductor current in a switching power converter using a non-inductor-current signal.

In another embodiment of the present invention, a power supply includes a switching power converter. The switching power converter includes a reference terminal, an input terminal to receive an input voltage, an inductor coupled to the input terminal, a power regulation switch coupled between the inductor and the reference terminal, a capacitor coupled to the switch, the inductor, and the reference terminal, and an output terminal coupled to the capacitor to provide a link voltage. The power supply further includes a controller. The controller is configured to detect an over-current condition of an inductor current in the switching power converter using a non-inductor-current signal.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
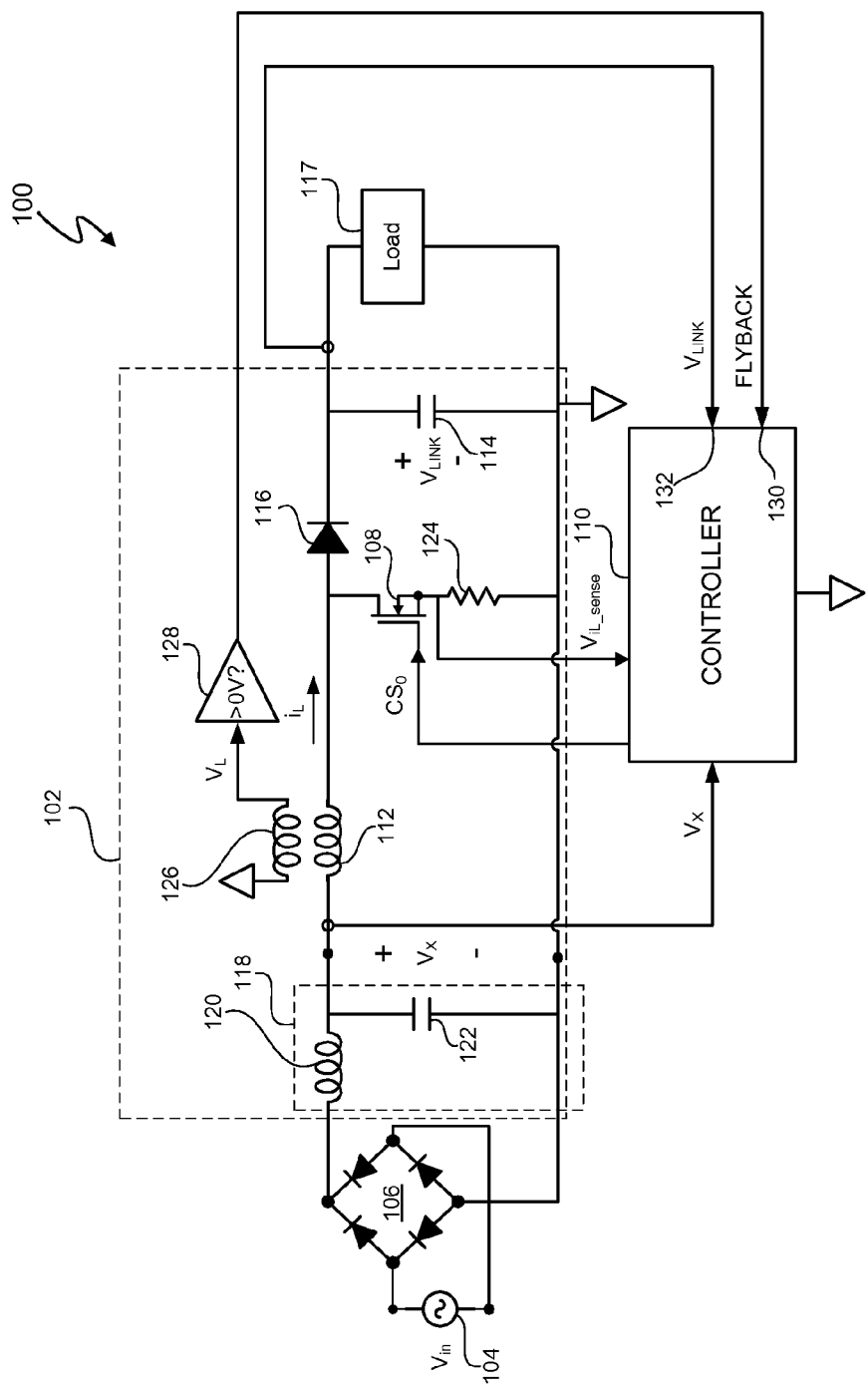
FIG. 1 (labeled prior art) depicts a power control system.
Figure 2:
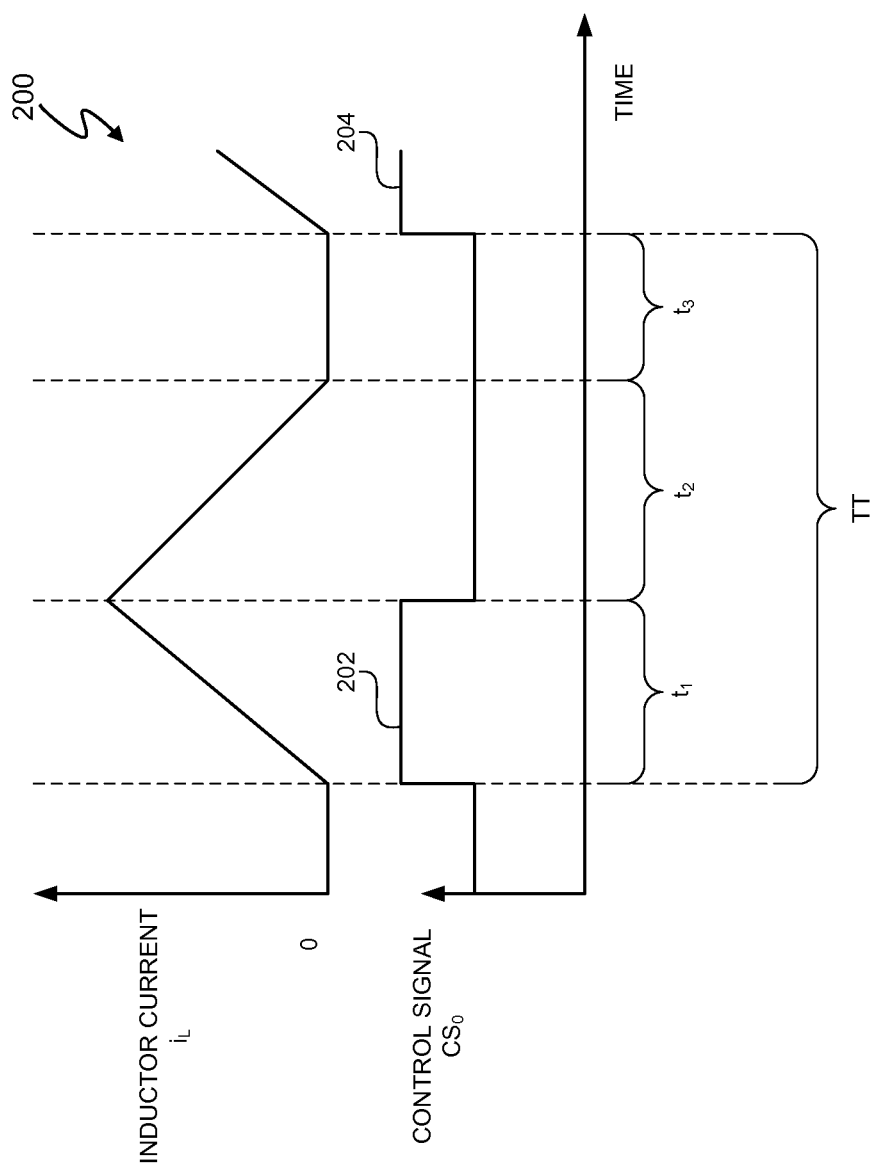
FIG. 2 (labeled prior art) depicts switching power converter control signal and inductor current timing diagrams.

A power control system includes a switching power converter and a controller. The controller is configured to detect an over-current condition of an inductor current in the switching power converter using at least one non-inductor-current signal. An inductor current signal is a signal that represents an inductor current and varies directly with the inductor current. For example, inductor current sense voltage $V_{iL\_sense}$ (FIG. 1) is an inductor current signal because inductor current sense voltage $V_{iL\_sense}$ represents the inductor current and varies directly as the inductor current $i_L$ varies. A "non-inductor-current signal" is a signal that does not represent and does not vary directly with the inductor current. In at least one embodiment, the switching power converter does not have a resistor or resistor network to sense the inductor current. In at least one embodiment, the controller is configured to detect an over-current condition of an inductor current in a switching power converter without using a signal generated using a resistor in series with a power regulation switch of the switching power converter. In at least one embodiment, the controller indirectly determines a state of the inductor current using at least one non-inductor-current signal.

In at least one embodiment, an inductor over-current condition represents a condition when the inductor current exceeds a predetermined threshold value. For example, in at least one embodiment, an inductor over-current condition can arise when energy is being transferred to an inductor of the switching power converter via an inductor current. Electromagnetic interference (EMI) filter interactions, such as ringing in the EMI filter, and other conditions can cause the inductor current to exceed a safe operating level. Sudden rises in the inductor current can also cause an inductor over-current condition. Sudden rises in the inductor current can be difficult to detect. Consequently, the controller can miscalculate timing of a power regulation switch control signal and inadvertently cause the switching power converter to enter into continuous conduction mode (CCM). Entering CCM can result in unintended, potentially damaging output voltages and input currents.

In at least one embodiment, by monitoring at least one non-inductor-current signal, the controller can protect the switching power converter from damaging conditions such as an excessive inductor current and CCM operation by a DCM power control system. In at least one embodiment, the controller monitors two non-inductor-current signals: (i) an input signal representing an input voltage to the switching power converter and (ii) a link voltage signal representing a link (i.e. output) voltage of the switching power converter. In at least one embodiment, when energy is transferred to the inductor from an input voltage source, an accumulation of samples of the input voltage signal is directly proportional to the inductor current. The accumulation of the input voltage signal can be measured in volt-second terms and compared to a predetermined threshold volt-second value to determine if an inductor over-current condition exists. In at least one embodiment, if the inductor over-current condition exists, the controller takes remedial action, such as decreasing the amount of current flowing into the inductor. In at least one embodiment, the controller decreases the amount of current flowing into the inductor by turning the power regulation switch "OFF", i.e. causing the power regulation switch to stop conducting.

In another embodiment, the final value of the input signal accumulation represents an initial accumulator value during an inductor flyback time. During the inductor flyback time, the current accumulator value $A(n)_{VS\_OVR}$ is determined by subtracting a difference between (i) the current link voltage $V_{LINK}'(n)$ and (ii) the current input voltage signal $V_X'(n)$ from the previous accumulator value $A(n-1)_{VS\_OVR}$, i.e. $A(n)_{VS\_OVR} = A(n-1)_{VS\_OVR} - [V_{LINK}'(n) - V_X'(n)]$. When the current accumulator value $A(n)_{VS\_OVR}$ is less than or equal to zero, the inductor flyback period is over, i.e. the inductor current is zero. The controller prevents the power regulation switch from conducting until the current accumulator value $A(n)_{VS\_OVR}$ is zero, and, thus, prevents the switching power converter from operating in CCM.

Figure 3:
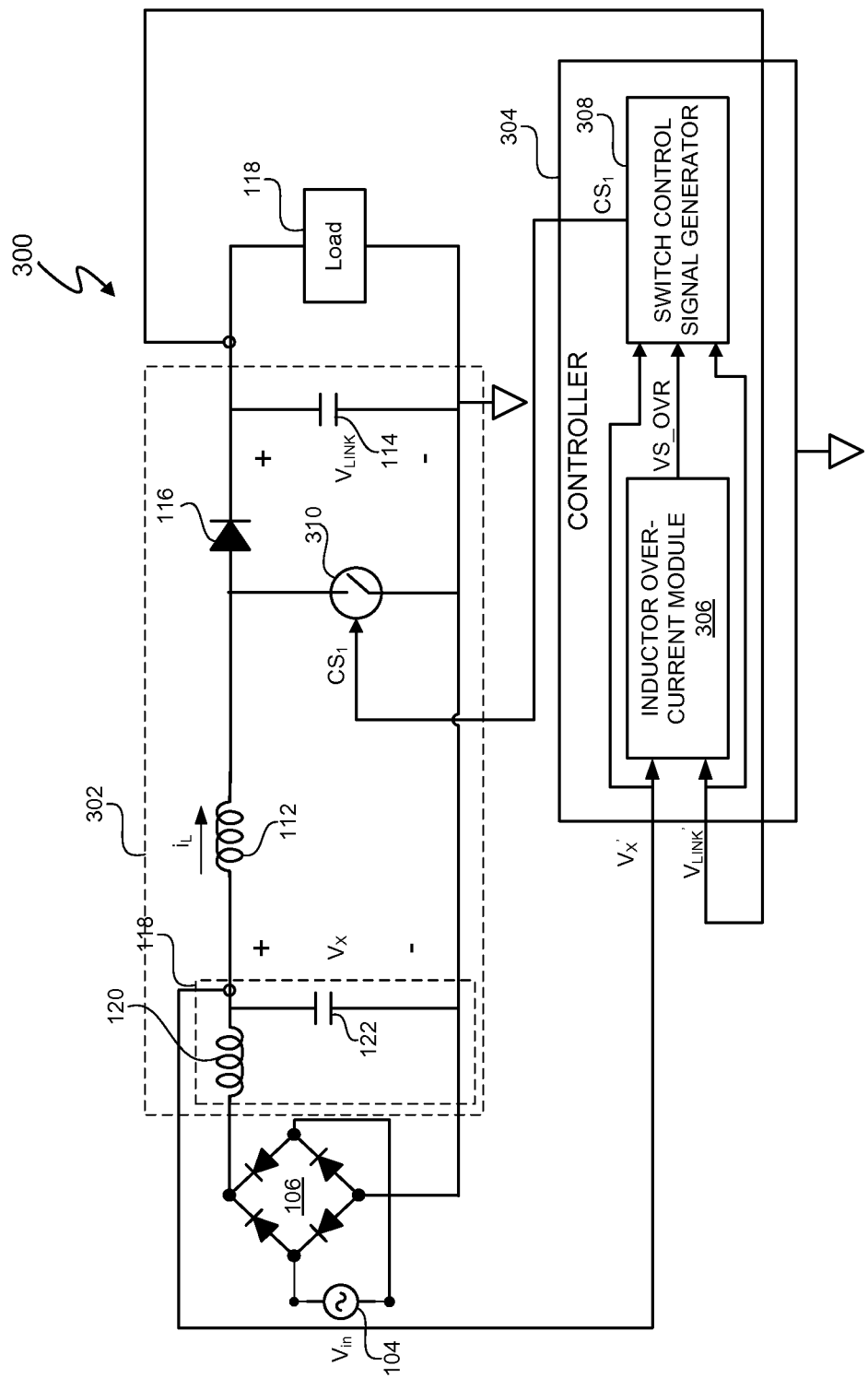
FIG. 3 depicts a power control system with inductor over-current and discontinuous current mode (DCM) protection with non-resistive based inductor current feedback.

FIG. 3 depicts a power control system 300 that includes a switching power converter 302 and a controller 304. The switching power converter 302 is configured as a boost-type switching power converter but can be any other type of switching power converter including a buck converter, buck-boost converter, and a Cúk converter. In at least one embodiment, the switching power converter 302 functions in the same manner as switching power converter 102 except that switching power converter 302 does not include an inductor current sense resistor or any other feature to provide an inductor current signal to controller 304. Thus, in at least one embodiment, controller 304 is configured to detect an over-current condition of inductor current $i_L$ in switching power converter 302 without using a signal generated using a resistor (such as inductor sense resistor 124 of FIG. 1) in series with power regulation switch 310. The particular mode in which controller 304 operates switching power converter 302 is a matter of design choice. For example, in at least one embodiment, controller 304 operates switching power converter 302 in discontinuous conduction mode (DCM). In other embodiments, controller 304 operates switching power converter 302 in continuous conduction mode (CCM) or critical conduction mode (CRM). The rectifier 106 can be separate from the switching power converter 302, as shown, or part of the switching power converter 302.

The controller 304 includes an inductor over-current module 306. Using at least one non-inductor-current signal, the inductor over-current module 306 determines whether an inductor over-current condition exists in switching power converter 302. In the embodiment of power control system 300, input voltage signal $V_X'$ represents the input voltage Vx, and link voltage signal $V_{LINK}'$ represents the link voltage $V_{LINK}$. In at least one embodiment, input voltage signal $V_X'$ and link voltage signal $V_{LINK}'$ are scaled versions of respective input voltage Vx and link voltage $V_{LINK}$. In at least one embodiment, the input voltage signal $V_X'$ and link voltage signal $V_{LINK}'$ are two non-inductor-current signals used by the inductor over-current module 306 to detect an inductor over-current condition. The particular scaling is a matter of design choice. By using non-inductor-current signals to detect an inductor over-current condition, in at least one embodiment, switching power converter 302 does not include an inductor current sense resistor such as inductor current sense resistor 120.

In at least one embodiment, inductor overcurrent module 306 utilizes the input signal $V_X'$ to determine an over-current condition exists corresponding to the inductor current $i_L$ reaching a level that could damage switching power converter 302 and/or load 117. In at least one embodiment, inductor overcurrent module 306 utilizes both the input voltage signal $V_X'$ and the link voltage signal $V_{LINK}'$ to determine an over-current condition corresponding to the inductor current $i_L$ being non-zero prior to when controller 304 would normally generate a next pulse of duty cycle modulated, switch control signal $CS_1$. If the controller 302 generates a pulse of switch control signal $CS_1$ prior to the inductor current $i_L$ reaching zero at the end of the inductor flyback time, the switching power converter will enter CCM. Entering CCM when the controller 302 normally controls the switching power converter 302 in DCM can cause the controller 302 to make erroneous calculations when generating the switch control signal $CS_1$. The resulting switch control signal $CS_1$ could alter a desired link voltage $V_{LINK}$, cause instability in controller 304, cause abnormally high inductor current $i_L$ values, and, thus, potentially damage to the switching power converter 302 and/or load 117.

The inductor over-current module 306 generates an over-current condition signal VS_OVR and provides the over-current condition signal VS_OVR to switch control signal generator 308. In at least one embodiment, in response to detecting an inductor over-current condition, inductor over-current module 306 generates the over-current condition signal VS_OVR to indicate the over-current condition. As subsequently discussed in more detail, the switch control signal generator 308 responds to the over-current condition signal VS_OVR by generating control signal $CS_1$ to resolve the inductor over-current condition.

The particular type(s) of inductor over-current condition(s) detectable by inductor over-current module 306 is(are) a matter of design choice. In at least one embodiment, inductor over-current module 306 detects an abnormally high inductor current $i_L$ and a non-zero inductor current $i_L$ that could cause the switching power converter 302 to operate in CCM.

Switch control generator 308 generates switch control signal $CS_1$ to control conductivity of power regulation switch 310. The type of power regulation switch 310 is a matter of design choice. In at least one embodiment, switch 310 is an n-channel MOSFET. In other embodiments, switch 310 is a bipolar junction transistor or an insulated gate bipolar junction transistor. The particular configuration of switch control generator 308 is also a matter of design choice. In at least one embodiment, switch control generator 308 includes both hardware and software (including firmware) to generate control signal $CS_1$. In at least one embodiment, in non-inductor over-current conditions, switch control generator 308 generates switch control signal $CS_1$ to operate power regulation switch 310 and thereby provide power factor correction and regulation of link voltage $V_{LINK}$ as illustratively described in U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007 (referred to herein as "Melanson I"). Melanson I is hereby incorporated by reference in its entirety. During detected inductor current over-current conditions, inductor over-current module 306 utilizes the over-current condition signal VS_OVR to, for example, modify the switch control signal $CS_1$.

Figure 4:
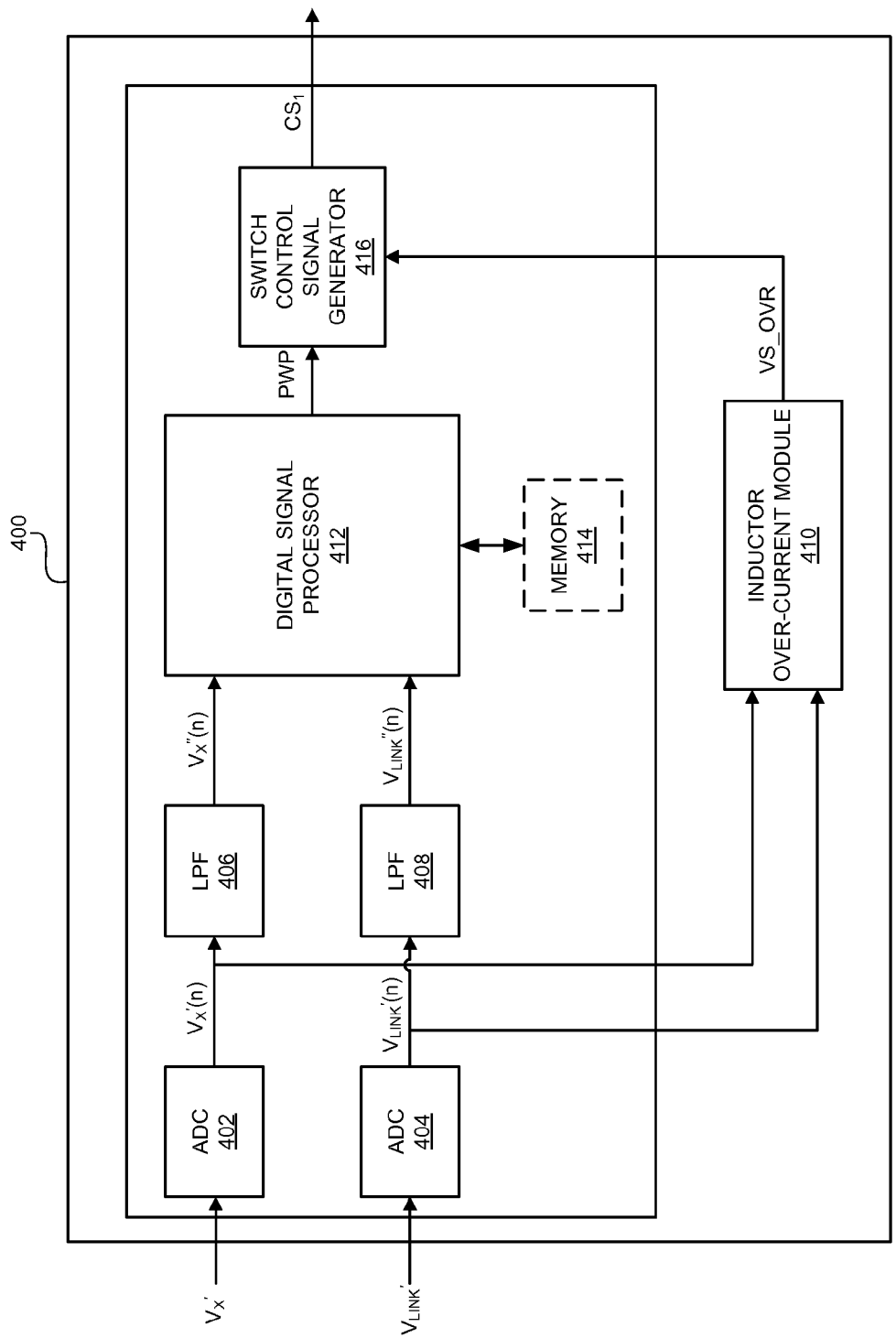
FIG. 4 depicts an embodiment of a controller for the power control system of FIG. 3.
Figure 5:
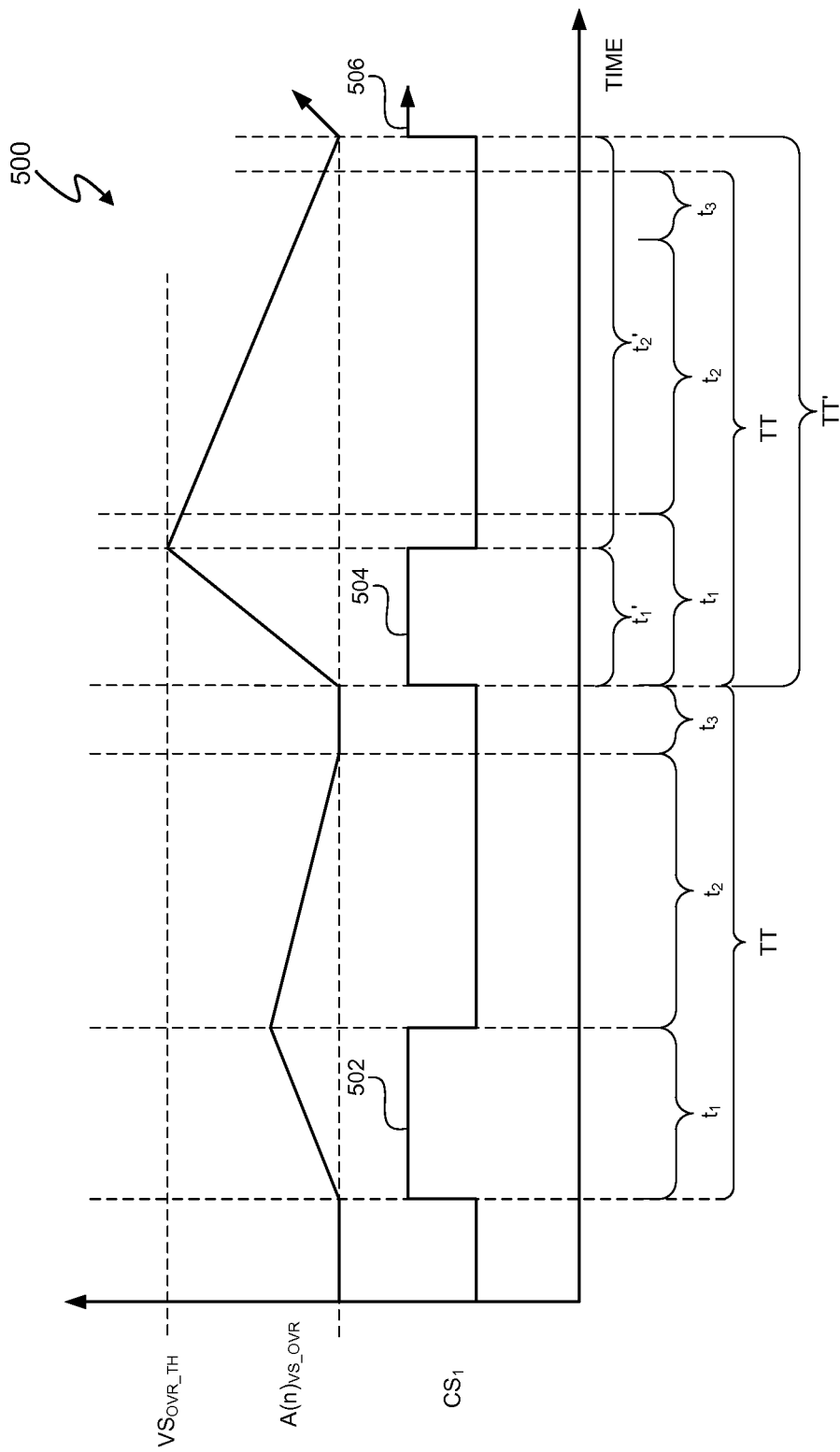
FIG. 5 depicts timing diagrams of a switch control signal of the controller of FIG. 4 and a volt-second over-current detection and protection related signals.
Figure 6:
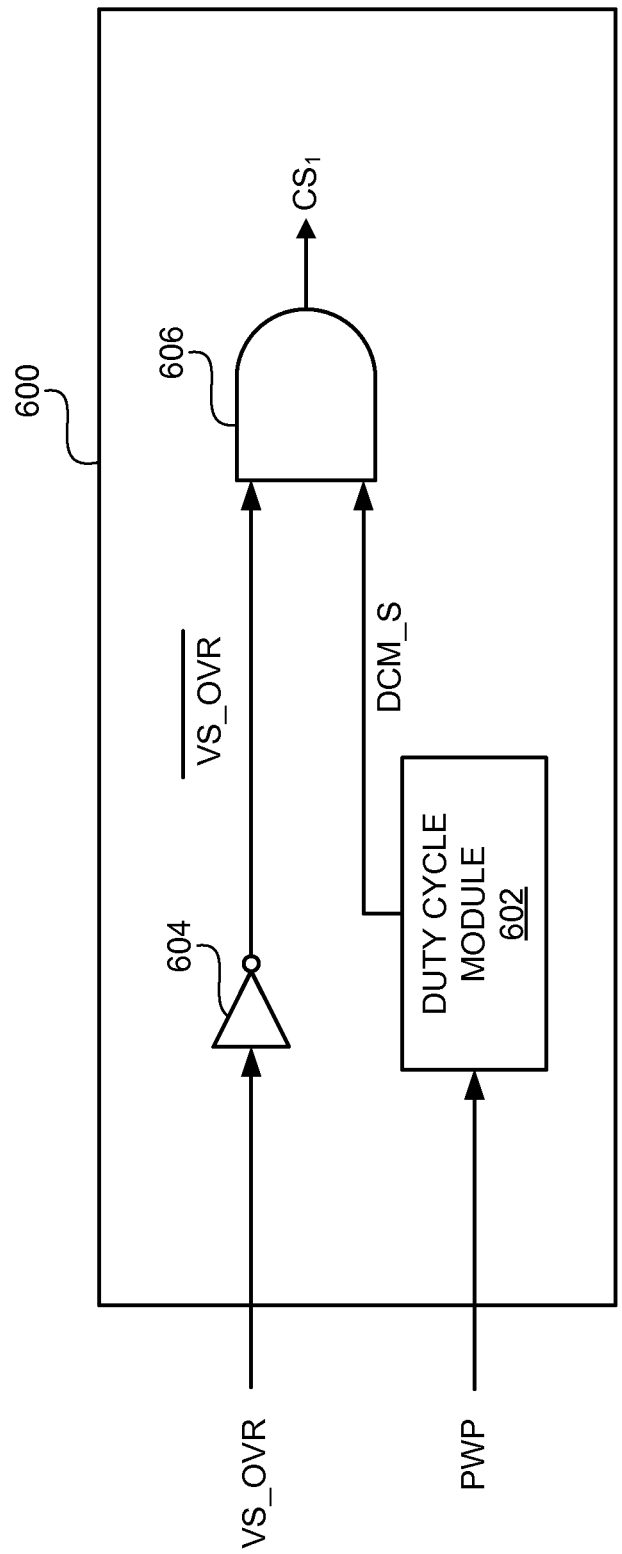
FIG. 6 depicts an embodiment of a switch control signal generator of the controller of FIG. 4.

FIG. 4 depicts controller 400, which represents one embodiment of controller 304. FIG. 5 represents exemplary control signal $CS_1$ and values of volt-second accumulator value $A(n)_{VS\_OVR}$ timing diagrams 500 for n=0 to N–1. "N" represents a number of samples of volt-second accumulator values $A(n)VS\_OVR$ during a period of switch control signal $CS_1$. As subsequently discussed in more detail, the volt-second accumulator value $A(n)_{VS\_OVR}$ represents the $n^{th}$ sample of the inductor current $i_L$ of switching power converter 400 based on non-inductor-current signals input voltage signal $V_X'$ and link voltage signal $V_{LINK}'$. "TT" and "TT'" represent respective periods of switch control signal $CS_1$, $t_1$ and $t_1'$ represent time durations of respective pulses of switch control signal $CS_1$, $t_2$ and $t_2'$ represent respective inductor flyback times of switching power converter 400, and $t_3$ represents a time period between an end of the inductor flyback time and a beginning of a next pulse of switch control signal $CS_1$. "$VS_{OVR\_TH}$" represents a threshold value of volt-second accumulator value $A(n)_{VS\_OVR}$.

Referring to FIGS. 4 and 5, controller 400 includes respective analog-to-digital converters (ADCs) 402 and 404 that respectively convert the input voltage signal $V_X'$ and link voltage signal $V_{LINK}'$ into respective digital values $V_X'(n)$ and $V_{LINK}'(n)$. "n" is an index representing a current sample, and "n–1" represents an immediately preceding sample. Respective low pass filters (LPFs) 406 and 408 respectively low pass filter digital signal values $V_X'(n)$ and $V_{LINK}'(n)$ to generate respective digital signal values $V_X''(n)$ and $V_{LINK}''(n)$. The particular design of the ADCs 402 and 404 and LPFs 406 and 408 is a matter of design choice.

In at least one embodiment, the ADCs 402 and 404 are designed to have a response time sufficient to sample and digitize values of the input voltage signal $V_X'$ and the link voltage signal $V_{LINK}'$ that can cause any type of inductor over-current condition addressed by inductor over-current module 410 within the $t_1$ and $t_2$ time periods. In at least one embodiment, time period $t_1$ is less than or equal to 10 microseconds (μs) and greater than or equal to 500 nanoseconds (ns), i.e. 500 ns≤$t_1$≤10 μs. In at least one embodiment, the bandwidth of link voltage $V_{LINK}$ is controlled by capacitance $C_{LINK}$ of link capacitor 114, and the bandwidth of the input voltage $V_X$ is controlled by the capacitance $C_{RECT}$ of filter capacitor 118. In at least one embodiment, for a 110V input voltage $V_X$, the sampling frequency of ADCs 402 and 404 is 1.3 MHz. In at least one embodiment, the sampling frequencies of ADCs 402 and 404 are set independently and are respectively 1.875 MHz and 0.725 MHz. An exemplary value of the capacitance $C_{LINK}$ is 100ρF, and an exemplary capacitance value of $C_{RECT}$ is 0.47ρF.

The digital signal processor (DSP) 412 determines pulse widths and periods of switch control signal $CS_1$ and provides the pulse width and period data in pulse width and period signal PWP. Pulse width and period signal PWP can be one or more distinct signals, e.g. separate pulse width and period control signals, that indicate the pulse width and period of switch control signal $CS_1$. In at least one embodiment, DSP 412 determines the pulse width and period signal PWP as described in Melanson I. From Melanson I, the pulse width and period signal PWP of DSP 412 would consist of a pulse width control signal $Q_{PW}(n)$ and a period control signal $Q_P(n)$. The particular configuration of DSP 412 is a matter of design choice. In at least one embodiment, DSP 412 is configured as an integrated circuit. In at least one embodiment, DSP 412 accesses and executes software stored in optional memory 414. In at least one embodiment, DSP 412 is implemented using discrete logic components.

A switch control signal generator 416 generates control signal $CS_1$ based on the information in the pulse width and period signal PWP received from DSP 412 and an over-current condition signal VS_OVR. As subsequently described in more detail, the inductor over-current module 410 generates the over-current condition signal VS_OVR. In at least one embodiment, if over-current condition signal VS_OVR does not indicate an inductor over-current condition, the switch control signal generator 416 generates the control signal $CS_1$ as described in Melanson I. In at least one embodiment, if over-current condition signal VS_OVR indicates an inductor over-current condition, switch control signal generator 416 modifies control signal $CS_1$. In at least one embodiment, switch control signal generator 416 modifies control signal $CS_1$ by ending a pulse or delaying generation of a pulse of control signal $CS_1$ until the over-current condition is resolved.

The inductor over-current module 410 receives the two non-inductor current input signals $V_X'(n)$ and $V_{LINK}'(n)$ and, based on the information in the input signals $V_X'(n)$ and $V_{LINK}'(n)$, determines whether one or more types of inductor over-current conditions exist. The particular configuration of the inductor over-current module 410 is a matter of design choice. In at least one embodiment, inductor over-current module 410 is configured as an integrated circuit. In at least one embodiment, controller 400 includes a processor, such as DSP 412, that executes code stored in optional memory 414 to implement the functions of inductor over-current module 410. In at least one embodiment, inductor over-current module 410 is implemented using logic components as described in more detail with reference to the over-current protection module 700 of FIG. 7.

FIG. 5 depicts a switch control signal generator 600, which represents one embodiment of switch control signal generator 416. The duty cycle module 802 generates a duty cycle modulation control signal DCM_S in response to the pulse width and period information provided by pulse width and period signal PWP. The duty cycle modulation control signal DCM_S represents the value of control signal $CS_1$ as determined by DSP 412. An inverter 604 inverts over-current condition signal VS_OVR to generate $\overline{VS\_OVR}$. Logic AND gate 606 performs a logic AND operation on the inverted over-current condition signal $\overline{VS\_OVR}$ and the duty cycle modulation control signal DCM_S. The output of logic AND gate 606 is the switch control signal $CS_1$. The generation of output signal VS_OVR is discussed in more detail with reference to FIGS. 4, 5, 6, 7, and 8.

The following describes the states and effects thereof of the inverted over-current condition signal $\overline{VS\_OVR}$ and the duty cycle modulation control signal DCM_S:

$\overline{VS\_OVR}$=0: If inverted over-current condition signal $\overline{VS\_OVR}$ is a logical 0, the inductor current $i_L$ is either above a normal operating range and is high enough to cause potential damage to switching power converter 302 and/or load 117 or over-current response process 800 prevents entering CCM by delaying a next pulse of switch control signal $CS_1$ until the possibility of CCM operation is over.

$\overline{VS\_OVR}$=1: If inverted over-current condition signal $\overline{VS\_OVR}$ is a logical 1, the inductor current $i_L$ is within a normal operating range and compilation profile engine 302 is operating in DCM.

DCM_S=0: If the duty cycle modulation control signal DCM_S is a logical 0, DSP 412 has determined that switch control signal $CS_1$ should be a logical zero.

DCM_S=1: If the duty cycle modulation control signal DCM_S is a logical 1, DSP 412 has determined that a pulse of switch control signal $CS_1$ should begin.

Figure 7:
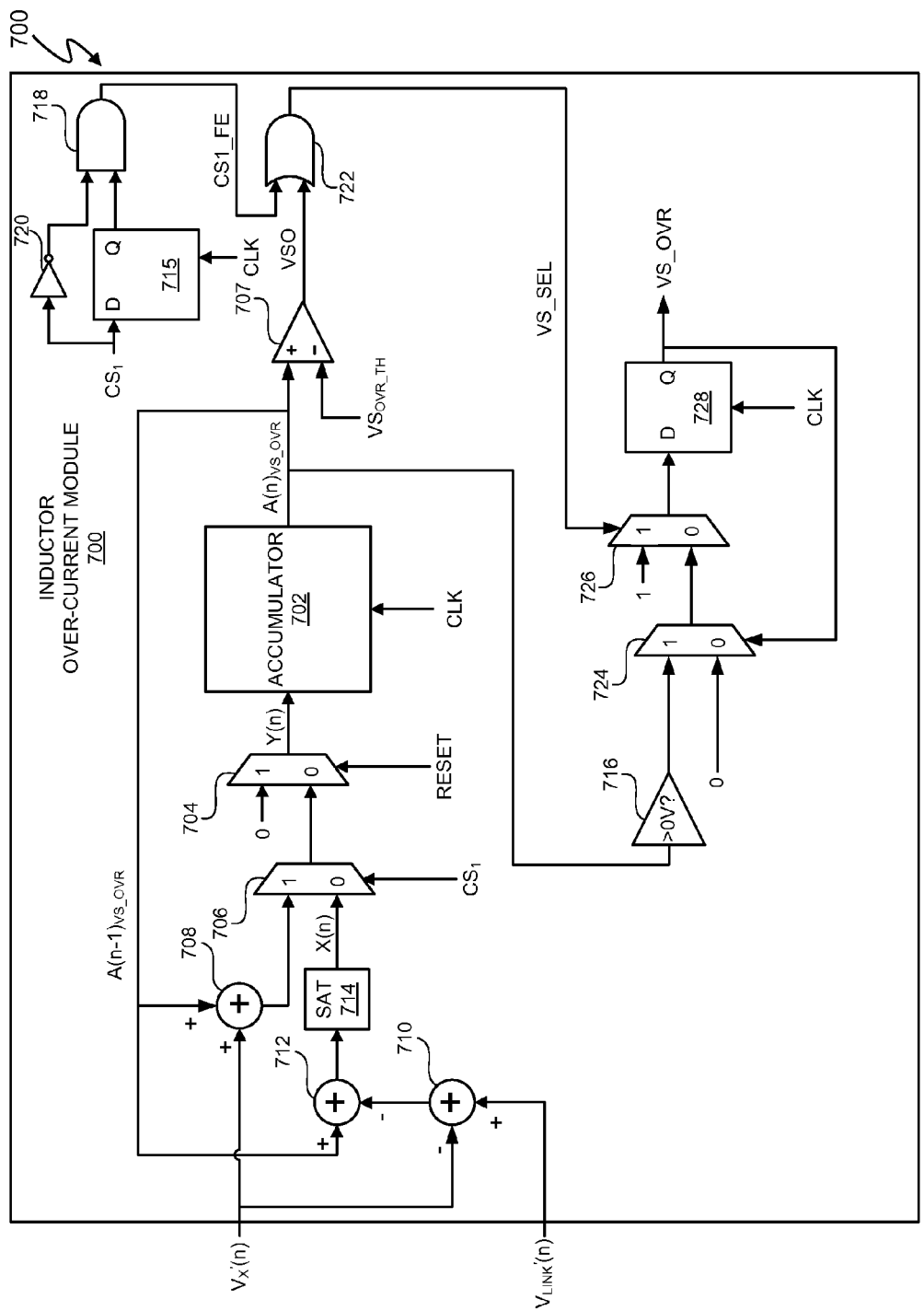
FIG. 7 depicts an embodiment of an inductor over-current and DCM protection module.
Figure 8:
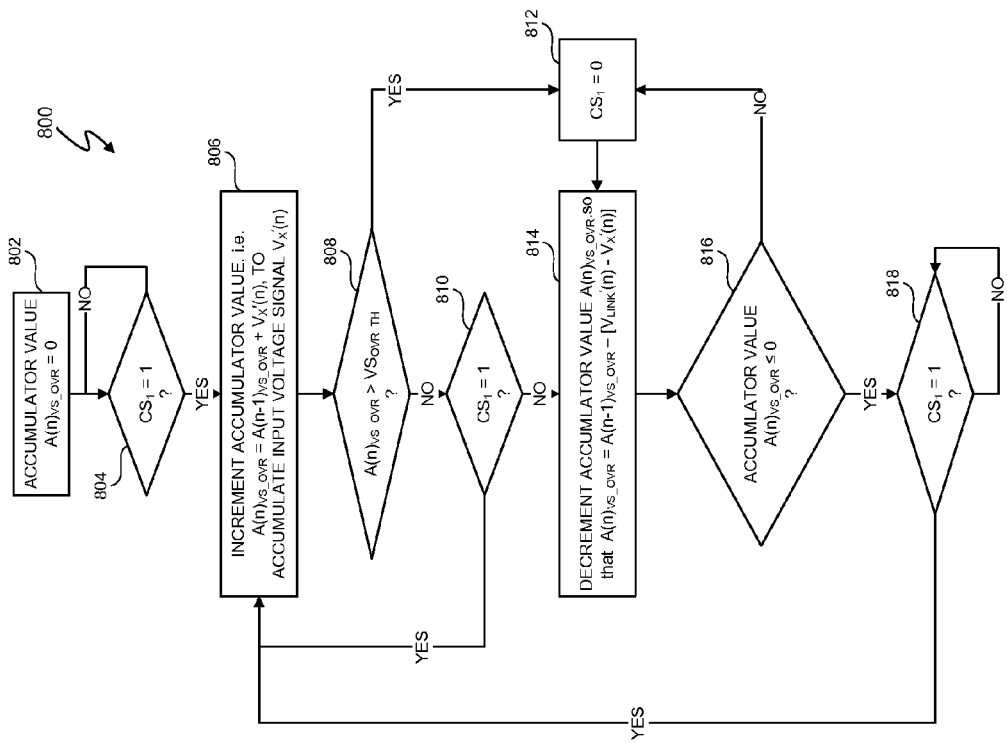
FIG. 8 depicts an embodiment of an inductor over-current and DCM protection algorithm for the controller of FIG. 4.

FIG. 7 depicts inductor over-current protection module 700 ("over-current protection module 700"), which represents one embodiment of inductor over-current module 410. FIG. 8 depicts an inductor over-current condition detection and response process 800 (referred to herein as the "over-current response process 800"). The over-current response process 800 represents one embodiment of the operation of inductor over-current module 700. The operation of over-current protection module 700 is described herein with various references to the switching power converter 302 of FIG. 3, the timing diagrams 500 of FIG. 5, and the over-current response process 800 of FIG. 8.

Referring to FIGS. 3, 4, 7, and 8, in summary, for each period of switch control signal $CS_1$, the operations of over-current response process 800 operate as follows:

(i) operations 802 and 804 initialize over-current protection module 700, (ii) operations 806-812 accumulate values of input voltage signal $V_X'(n)$, check for an inductor over-current condition when the inductor current $i_L$ exceeds a potentially harmful level, and terminate a pulse of switch control signal $CS_1$ if this inductor over-current condition is detected until the inductor current $i_L$ falls to zero, and (iii) (iii) operations 814-818 check for an inductor over-current condition when the inductor current $i_L$ has not reached zero during the inductor flyback period $t_2$ (FIG. 5) prior to when DSP 412 determines that a next pulse of switch control signal $CS_1$ should begin.

The over-current protection module 700 receives the input voltage signal $V_X'(n)$ and discrete link voltage signal $V_{LINK}'(n)$. As previously stated, input voltage signal $V_X'(n)$ and link voltage signal $V_{LINK}'(n)$ are non-inductor-current signals representing respective, discrete values of input voltage $V_X$ and link voltage $V_{LINK}$. The over-current protection module 700 includes an accumulator 702 to accumulate values of input voltage signal $V_X'(n)$ during a pulse of switch control signal $CS_1$. The accumulator 702 also decrements the current accumulator value $A(n)_{VS\_OVR}$ by $[V_{LINK}'(n)-V_X'(n)]$ to track the inductor current $i_L$ during inductor flyback periods. Operation 802 is an initialization operation that resets the accumulator output value $A(0)_{VS\_OVR}$ to zero (0) by asserting the RESET signal at the select terminal of 2:1 multiplexer 704. The zero at input 1 of multiplexer 704 forces the accumulator output value $A(n)_{VS\_OVR}$ to zero. After operation 802, the RESET signal is deasserted, and the 0 input is selected by multiplexer 704. In at least one embodiment, the accumulator 702 is a register that is updated at the frequency of clock signal CLK. Thus, forcing the input of accumulator 702 to zero (0) sets the current accumulator value $A(n)_{VS\_OVR}$ to zero (0).

Operation 804 is also an initialization operation. If the switch control signal $CS_1$ is a logical 1, i.e. switch 310 (FIG. 3) conducts, then over-current response process 800 proceeds to operation 806. Otherwise, over-current response process 800 waits to proceed to operation 806 until the switch control signal $CS_1$ becomes a logical 1. In at least one embodiment, the inductor over-current module 410 conducts operations 802 and 804 when controller 400 is turned ON.

Referring to FIGS. 3, 5, 7, and 8, the following discussion of over-current response process 800 assumes that inductor over-current module 410 does not detect an inductor over-current condition as indicated by period TT associated with pulse 502 in the timing diagram 500. In operation 804, when switch control signal $CS_1$ becomes a logical 1 at the beginning of pulse 502, which coincides with the beginning of time period $t_1$, over-current response process 800 proceeds to operation 806. The logical 1 value of switch control signal $CS_1$ selects the 1 input of multiplexer 706.

Operation 806 increments the previous accumulator value $A(n-1)_{VS\_OVR}$ by the current value of input voltage signal $V_X'$. Adder 708 increments the previous (n-1) accumulator value $A(n-1)_{VS\_OVR}$ by the current value (n) of input voltage signal $V_X'(n)$. Multiplexers 706 and 708 pass the sum of $V_X'(n)$ and $A(n-1)_{VS\_OVR}$ so that the input value Y(n) of accumulator 702 equals $A(n-1)_{VS\_OVR}+V_X'(n)$. The current accumulator value $A(n)_{VS\_OVR}$ then becomes Y(n)= $A(n-1)_{VS\_OVR}+V_X'(n)$. Thus, since the initial accumulator value $A(0)_{VS\_OVR}$ equals 0, during time $t_1$ accumulator 702 effectively accumulates successive values of input voltage signal $V_X'(n)$. The unit of accumulator value $A(n)_{VS\_OVR}$ is "volt-second".

When control signal $CS_1$ becomes a logical 1, inductor current $i_L$ (FIG. 3) begins to rise and energy is stored in inductor 112 (FIG. 3). During time $t_1$, the input voltage $V_X$ is related to the inductor current $i_L$ in accordance with Equation $V_X=L\cdot di_L/dt$ [1]:

$$V_X=L\cdot di_L/dt \quad [1];$$

where L is the inductance value of inductor 112 (FIG. 3). By rearranging Equation $V_X=L\cdot di_L/dt$ [1], Equation $$i_L = \int_0^{t1\_end} \frac{V_X}{L} \cdot dt \quad [2]$$

[2] illustrates that the inductor current $i_L$ is related to the accumulation (represented in one embodiment by an integration) of the input voltage $V_X$:

$$i_L = \int_0^{t1\_end} \frac{V_X}{L} \cdot dt; \quad [2]$$

where $t_{1\_end}$ is the time at which time period $t_1$

Referring to FIGS. 4 and 7, the LPFs 402 and 404 can filter out sudden changes to input voltage signal $V_X'$ and link voltage signal $V_{LINK}'$. Sudden changes in the input voltage signal $V_X'$ can be caused by, for example, transient voltages produced by transients of input voltage rectified input voltage $V_X$ or ringing in the EMI filter 118. However, as previously discussed, sudden changes to input voltage signal $V_X'$ can cause improper operation of controller 400. Accordingly, in at least one embodiment, inductor current modules 410 and 700 process the output signals $V_X'(n)$ and $V_{LINK}'(n)$ directly.

To detect an inductor over-current condition caused by a potentially harmful transient increase of inductor current $i_L$, operation 808 compares the current accumulator value $A(n)_{VS\_OVR}$ with the over-current threshold value $VS_{OVR\_TH}$. In at least one embodiment, the over-current threshold value $VS_{OVR\_TH}$ represents a value of input voltage $V_X'$ that is detectable by ADC 402 and is associated with an inductor current $i_L$ that could potentially damage switching power converter 302 and/or load 117. The particular determination of over-current threshold value $VS_{OVR\_TH}$ is a matter of design choice. In at least one embodiment, over-current threshold value SOVR_TH=VPEAKLOW·VLINK·VXPEAKLOW/(fmax·VLINK·0.85) [3]:

$$VS_{OVR\_TH} = V_{PEAKLOW} \cdot (V_{LINK} - V_{XPEAKLOW}) / (f_{max} \cdot V_{LINK} \cdot 0.85) \quad [3];$$

where $V_{PEAKLOW}$ is a minimum root mean square value (RMS) of input voltage $V_X$, $V_{LINK}$ is the desired RMS value of link voltage $V_{LINK}$, $f_{max}$ is the maximum frequency of control signal $CS_1$, and 0.85 is a tolerance factor for a tolerance between a stated inductance value of inductor 112 and an actual inductance value of inductor 112. In one embodiment, for $V_{PEAKLOW}=127V$, $V_{LINK}=400V$, $f_{max}=80$ kHz, $VS_{OVR\_TH}=127 \cdot (400-127)/(80,000 \cdot 400 \cdot 0.85)=0.001275$ Vsec.

Equation $VS_{OVR\_TH} = V_{PEAKLOW} \cdot (V_{LINK} - V_{XPEAKLOW})/(f_{max} \cdot V_{LINK} \cdot 0.85)$ [3] is derived from Equations [4]-[7]:

$$L_C = V_{PEAKLOW}^2 \cdot (V_{LINK} - V_{PEAKLOW}) / (4 \cdot f_{max} \cdot PoVLINK) \quad [4];$$

$$MaxIpeak = V_{PEAKLOW} \cdot (V_{LINK} - V_{PEAKLOW}) / (f_{max} \cdot L \cdot V_{LINK}) \quad [5];$$

$$L = 0.85 L_C \quad [6];$$

and $$VS_{OVR\_TH} = L_C \cdot MaxIpeak \quad [7];$$

where $L_C$ is a maximum inductance value of inductor 112 within the tolerance of an inductance value of inductor 112. PoVLINK represents a maximum power output of switching power converter 302. MaxIpeak is a maximum desired inductor current $i_L$, and L is the inductance value of inductor 112.

Referring to FIGS. 4, 5, 7, and 8, in operation 808, if the current accumulator value $A(n)_{VS\_OVR}$ does not exceed the over-current threshold value $VS_{OVR\_TH}$, operation 810 determines if the switch control signal $CS_1$ is still a logical 1. If the switch control signal $CS_1$ is still a logical 1, i.e. switch control signal $CS_1$ is still in time period $t_1$ (FIG. 5), then over-current response process 800 returns to operation 806 and continues therefrom. Comparator 707 compares the current accumulator value $A(n)_{VS\_OVR}$ with over-current threshold value $VS_{OVR\_TH}$ at operation 808. The output signal VSO of comparator 707 takes the value of logical 1 when the current accumulator value $A(n)_{VS\_OVR}$ is greater than the over-current threshold value $VS_{OVR\_TH}$ and is otherwise a logical 0. A logical 0 is, for example, 0V. If the output signal VSO is a logical 0, the over-current response process 800 returns to operation 806.

By returning to operation 806, accumulator 702 continues to accumulate sample values of input voltage signal $V_X'(n)$.

Assuming that the inductor current $i_L$ is not in an over-current condition, i.e. in operation 808 $A(n)_{VS\_OVR} \leq VS_{OVR\_TH}$, when switch control signal $CS_1$ becomes a logical 0 at the beginning of time period $t_2$, over-current response process 800 proceeds from operation 810 to operation 814. At the beginning of time period $t_2$, switching power converter 302 enters the inductor flyback period and proceeds to operation 814.

Operation 814 decrements the previous accumulator value $A(n-1)_{VS\_OVR}$ by the current (n) link voltage signal $V_{LINK}'(n)$ minus the input voltage $V_X'(n)$ to obtain a current accumulator value $A(n)_{VS\_OVR}$. To accomplish operation 814, adder 712 adds the link voltage signal $V_{LINK}'$ to a negative input voltage signal $V_X'$, i.e. $V_{LINK}'(n)$ $V_X'(n)$. Adder 712 adds the previous accumulator value $A(n-1)_{VS\_OVR}$ to the negative of the result of adder 710 and provides the result to saturation module (SAT) 714. SAT 714 passes the output of adder 712 to multiplexer 706 but prevents the output of adder 712 from becoming a negative value. In other words, $X(n)=A(n-1)_{VS\_OVR}-[V_{LINK}'(n)-V_X'(n)]$, and $A(n-1)_{VS\_OVR}=0$ if $[V_{LINK}'(n)-V_X'(n)]<0$. Switch control signal $CS_1$ selects the 0 input of multiplexer 706 so that $Y(n)=X(n)$. Value $Y(n)$ is the input to accumulator 702, so the current accumulator value $A(n)_{VS\_OVR}=Y(n)$. Thus, $A(n)_{VS\_OVR}=A(n-1)_{VS\_OVR}-[V_{LINK}'(n)-V_X'(n)]$ or equals 0 if $[V_{LINK}'(n)-V_X'(n)]<0$. By decrementing the current accumulator value $A(n)_{VS\_OVR}$ by the difference between $V_{LINK}'(n)$ and $V_X'(n)$, the current accumulator value $A(n)_{VS\_OVR}$ is proportional to and, thus, tracks the inductor current $i_L$.

Operation 816 determines whether the current accumulator value $A(n)_{VS\_OVR}$ is less than or equal to 0. The current state of switch control signal $CS_1$ when the clock signal CLK transitions to a logical 1 is latched by D-flip flop 715 at the Q output. The Q output is provided as an input to logic AND gate 718. Inverter 720 current provides an inverted switch control signal $\overline{CS_1}$ as a second input to AND gate 718. The output of AND gate 718 is falling edge signal CS1_FE. Falling edge signal CS1_FE transitions from a logical 0 to a logical 1 when a pulse, such as pulses 502 or 504, of switch control signal $CS_1$ transitions from logical 1 to logical 0. In other words, falling edge signal CS1_FE transitions from a logical 0 to a logical 1 at the falling edge of a pulse of switch control signal $CS_1$.

Logic OR gate 722 receives the output signal VSO from comparator 707 and falling edge signal CS1_FE and generates an output signal VS_SEL. The states and interpretation of output signal VS_SEL are as follows:
 (i) VS_SEL=1 when at a falling edge of switch control signal $CS_1$.
 (ii) VS_SEL=1 if the current accumulator value $A(n)_{VS\_OVR}$ is greater than the volt-second over-current threshold value $VS_{OVR\_TH}$.
 (iii) VS_SEL=0 if (a) switch control signal $CS_1$ is at any state other than a falling edge transition and (b) the current accumulator value $A(n)_{VS\_OVR}$ is less than the volt-second over-current threshold value $VS_{OVR\_TH}$.

If output signal VS_SEL is a logical 1 due to state (i), then output signal VS_SEL will allow operation 816 to prevent a new pulse, such as pulse 504, of switch control signal $CS_1$ from occurring if the current accumulator value $A(n)_{VS\_OVR}$ is not zero. If output signal VS_SEL is a logical 1 due to state (ii), then output signal VS_SEL will allow operation 808 to drive switch control signal $CS_1$ to zero. If output signal VS_SEL is a logical 1, then the pulse width and period signal PWP from DSP 412 controls the state of switch control signal $CS_1$.

Continuing at operation 816, comparator 716 determines whether the current accumulator $A(n)_{VS\_OVR}$ is less than or equal to zero. If the current accumulator value $A(n)_{VS\_OVR}$ is greater than 0, then the switching power converter 302 is still in an inductor flyback period $t_2$, and the output of comparator 716 is a logical 1. If the current accumulator value $A(n)_{VS\_OVR}$ is less than or equal to 0, then the switching power converter 302 has completed the inductor flyback, and the output of comparator 716 is a logical 0. A volt-second overprotection signal VS_OVR provides the selection input signal for 2:1 multiplexer 724. Initially, the volt-second overprotection signal VS_OVR is set to logical 0. The output signal VS_SEL is the select signal for 2:1 multiplexer 726. If the accumulator value $A(n)_{VS\_OVR}$ is less than the volt-second over-current threshold value $VS_{OVR\_TH}$ and a falling edge of switch control signal $CS_1$ is not occurring, then the output signal VS_SEL is a logical 0 and D flip-flop 728 latches output signal VS_OVR to a logical 0. If output signal VS_OVR is a logical 0, then the pulse width and period signal PWP of DSP 412 controls the state of switch control signal $CS_1$. The value of output signal VS_OVR can cause switch control signal generator 416 (FIG. 4) to override an indication by pulse width and period signal PWP of DSP 412 (FIG. 4) to initiate a pulse of switch control signal $CS_1$ when the value of inductor current $i_L$ is causing an over-current condition.

In operation 816, if the current accumulator value $A(n)_{VS\_OVR}$ is greater than zero, then the switching power converter 302 is still in an inductor flyback period $t_2$ and operation 812 keeps the switch control signal $CS_1$ at zero. Keeping the switch control signal $CS_1$ at zero stops the current flow into inductor 112 (FIG. 3). The inductor current over-current module 700 follows operation 812 because when the flyback period $t_2$ begins, switch control signal $CS_1$ transitions from 1 to 0, and output signal VS_SEL becomes a logical 1. Multiplexer 726 then passes a logical 1, and output signal VS_OVR becomes a logical 1. When output signal VS_OVR is a logical 1, multiplexer 724 selects the output of comparator 716 as the input to multiplexer 726. When switch control signal $CS_1$ is zero, output signal VS_SEL changes to logical 0 unless the current accumulator value $A(n)_{VS\_OVR}$ is greater than the volt-second over-current threshold value $VS_{OVR\_TH}$. Assuming the current accumulator value $A(n)_{VS\_OVR}$ is not greater than the volt-second over-current threshold value $VS_{OVR\_TH}$, the output signal VS_OVR will remain a logical 0 based on the output of comparator 716 until the current accumulator value $A(n)_{VS\_OVR}$ equals zero. If the current accumulator value $A(n)_{VS\_OVR}$ equals zero, the inductor flyback period $t_2$ of switching power converter 302 has ended. Operations 812, 814, and 816 repeat until the inductor flyback period $t_2$ is over.

Thus, operations 812, 814, and 816 keep the switch control signal $CS_1$ at logical 0 thereby preventing a new pulse of switch control signal $CS_1$ from turning switch 310 ON, until inductor current $i_L$ is zero. When the inductor current $i_L$ equals 0, the inductor flyback period $t_2$ is over. By keeping the switch control signal $CS_1$ at logical 0, operations 812, 814, and 816 prevent switching power converter 302 from operating in CCM. Operation 818 determines whether DSP 412 has indicated that the switch control signal $CS_1$ should be a logical 1. If DSP 412 has indicated that the switch control signal $CS_1$ should be a logical 1, during exemplary time period $t_3$, operation 818 waits for DSP 412 to indicate that the switch control signal $CS_1$ should be a logical 1. When operation 818 is true, over-current response process 800 returns to operation 806.

Referring to FIGS. 3, 5, 7, and 8, the following discussion of over-current response process 800 assumes that inductor over-current module 410 detects two inductor over-current conditions during the period TT' in the timing diagram 700. The first inductor over-current condition involving a potentially damaging, high inductor current $i_L$ is detected and resolved by operations 806-812. The second inductor over-current condition involves a non-zero inductor current $i_L$ that could cause switching power converter 302 to enter into CCM.

Operations 806-810 proceed as previously described to accumulate input signal value $V_x'(n)$ until operation 808 determines that the current accumulator value $A(n)_{VS\_OVR}$ is greater than the over-current threshold value $VS_{OVR\_TH}$ at the end of time period t'. If the current accumulator value $A(n)_{VS\_OVR}$ is greater than volt-second over-current threshold value $VS_{OVR\_TH}$, then output signals VSO and VS_SEL become logical 1's. Multiplexer 726 and D flip-flop 728 then force output signal VS_OVR to a logical 1. If output signal VS_OVR is a logical 1, then switch control signal $CS_1$ is forced to a logical zero. Thus, operation 808 proceeds to operation 812 when current accumulator value $A(n)_{VS\_OVR}$ is greater than volt-second over-current threshold value $VS_{OVR\_TH}$, and operation 812 causes switch control signal generator 416 to end the pulse 504 of switch control signal $CS_1$, i.e. switch control signal $CS_1$ transitions from a logical 1 to a logical 0. Ending the pulse 504 begins the inductor flyback period at the beginning of time period $t_2'$. Returning switch control signal $CS_1$ to a logical 0 turns switch 310 OFF, thus preventing the inductor current $i_L$ from further increasing. The output signals VSO and VS_SEL will stay at logical 1 and continue to force output signal VS_OVR to a logical 1 and switch control signal $CS_1$ to a logical zero for at least as long as the current accumulator value $A(n)_{VS\_OVR}$ is greater than the volt-second over-current threshold value $VS_{OVR\_TH}$. After switch control signal $CS_1$ is a logical 0, the falling edge signal CS1_FE transitions to a logical 0. Once the current accumulator value $A(n)_{VS\_OVR}$ is less than the volt-second over-current threshold value $VS_{OVR\_TH}$, output signal VS_SEL transitions to logical 0, and multiplexers 724 and 726 together with D flip-flop 728 force output signal VS_OVR to the value of the output of comparator 716.

Operations 812-816 delay the onset of the next pulse 506 of switch control signal $CS_1$ until the current accumulator value $A(n)_{VS\_OVR}$ equals zero at the end of time period $t_2'$. Operations 812-818 proceed as previously described to determine the end of the inductor flyback period from non-inductor-current signals $V_x'(n)$ and $V_{LINK}'(n)$ and then return to operation 806. During period TT', the inductor flyback period extends past the end of time period $t_3$. Thus, the inductor current $i_L$ and the current accumulator value $A(n)_{VS\_OVR}$ are nonzero at the time when DSP 412 indicates that a new pulse of switch control signal $CS_1$ should begin. The output of comparator 716 is, thus, a logical 1, which forces the output signal VS_OVR to a logical 1. As described in more detail with reference to FIG. 8, when output signal VS_OVR is a logical 1, the switch control signal $CS_1$ is forced to a logical 0 as indicated by operation 812.

Setting the output signal VS_OVR to logical 0 delays the onset of a next pulse of switch control signal $CS_1$ if pulse width and period signal PWP indicates that the next pulse of switch control signal $CS_1$ should begin. Delaying the onset of a next pulse of switch control signal $CS_1$ until the current accumulator value $A(n)_{VS\_OVR}$ equals zero prevents operation of switching power converter 302 in CCM. Preventing CCM operation resolves the over-current condition when the inductor current $i_L$ is non-zero at the time DSP 412 indicates that the next pulse 506 of switch control signal $CS_1$ should begin.

When operation 816 determines that the current accumulator value $A(n)_{VS\_OVR}$ is less than or equal to 0, the inductor current $i_L$ is also zero. When the current accumulator value $A(n)_{VS\_OVR}$ equals 0, the output of comparator 716 is a logical 0, and output signal VS_OVR is set to logical 0. With the output signals VS_OVR and VS_SEL at logical 0, output signal VS_OVR is a logical 0, and the pulse width and switch control signal generator 416 permits period signal PWP of DSP 412 to set switch control signal $CS_1$.

Referring to FIGS. 4 and 8, in at least one embodiment, the inductor over-current module 410 is implemented as code that is stored in a memory, such as memory 414. When implemented as code, the inductor over-current module 410 implements the over-current response process 800 when executed by a processor of controller 400. The particular type of processor is a matter of design choice and, in at least one embodiment, is DSP 412.

Figure 9A:
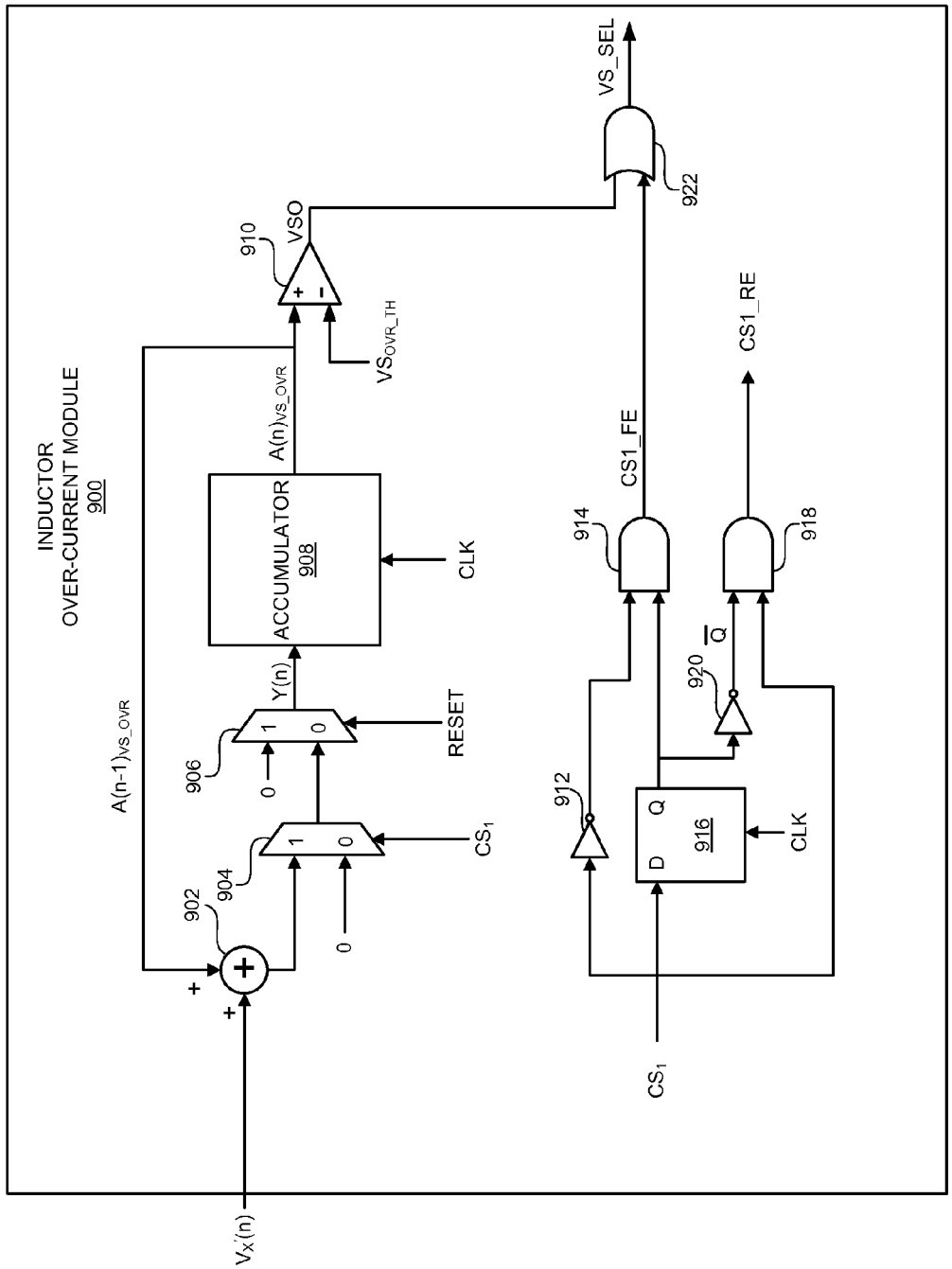
FIGS. 9A and 9B depict another embodiment of an inductor over-current and DCM protection module.
Figure 9B:
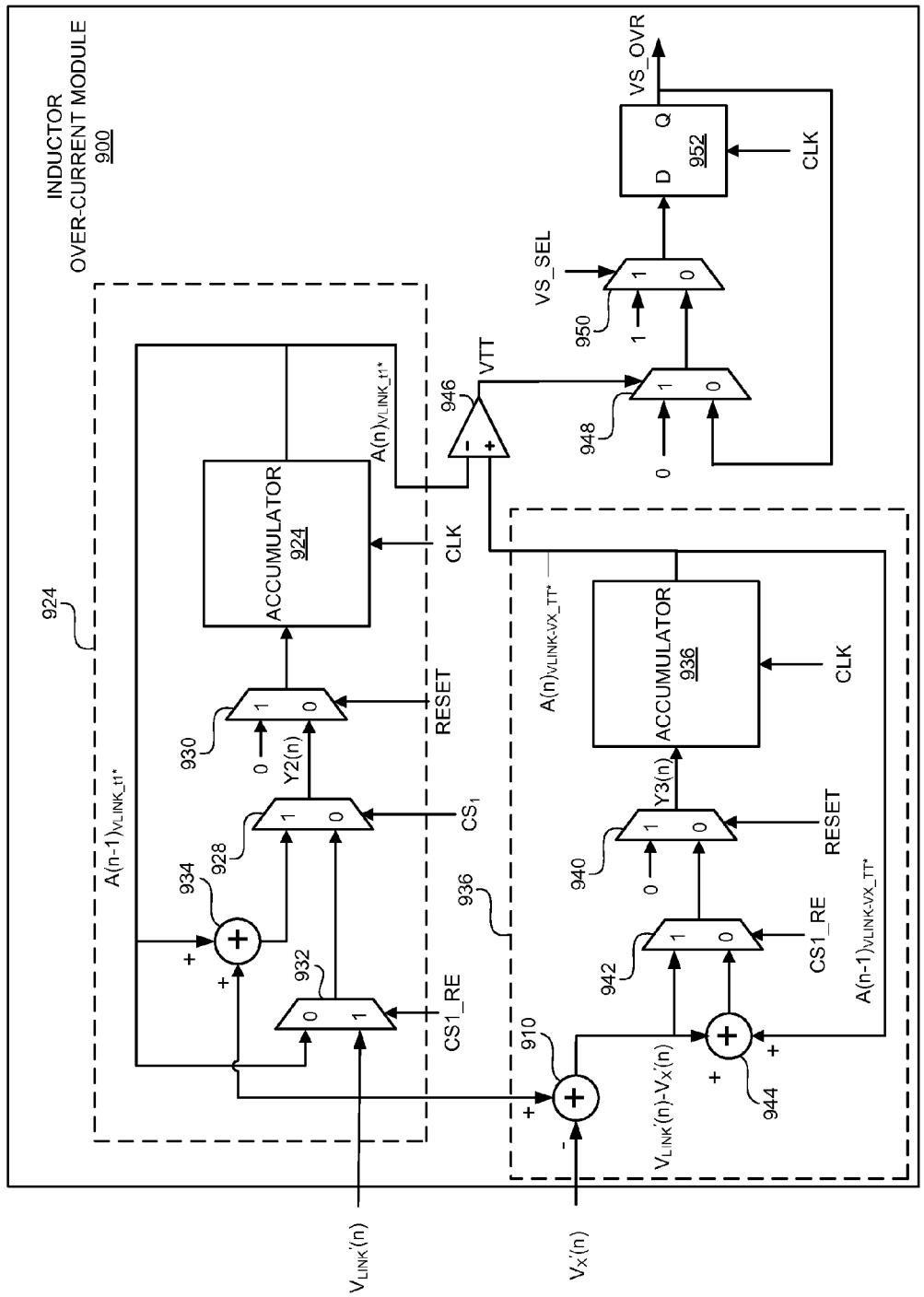

FIGS. 9A and 9B (collectively referred to as FIG. 9) depict inductor over-current protection module 900 ("over-current protection module 900"), which represents another embodiment of inductor over-current module 410. In summary, over-current protection module 900 provides inductor current protection when the inductor current $i_L$ exceeds a threshold value corresponding to the volt-second over-current threshold value $V_{SOVR\_TH}$ in the same manner as inductor current over-current module 700. However, instead of decrementing the accumulation of input voltage signal VX', over-current protection module 900 uses a DCM inequality of $TT \cdot [V_{LINK}'(n) - V_X'(n)] \geq V_{LINK}'(n) \cdot t_1$. Thus, difference signal [link voltage signal $V_{LINK}'(n)$ minus input voltage signal $V_X'(n)$] is accumulated over an entire period TT of switch control signal CS1, and the link voltage signal $V_{LINK}'(n)$ is accumulated until during a pulse, such as pulse 502 or 504 (FIG. 5), of the switch control signal $CS_1$. Once $TT \cdot [V_{LINK}'(n) - V_X'(n)]$ is greater than or equal to $V_{LINK}'(n) \cdot t_1$, the inductor flyback period is over, and a new pulse of switch control signal $CS_1$ can be generated by switch control signal generator 416 (FIG. 4).

Referring to FIG. 9A, over-current protection module 900 provides inductor current protection when the inductor current $i_L$ exceeds a threshold value corresponding to the volt-second over-current threshold value $V_{SOVR\_TH}$. Adder 902, 2:1 multiplexers 904 and 906, accumulator 908, and comparator 910 generate the output signal VSO in the same manner as their respective counterparts: adder 708, 2:1 multiplexers 706 and 704, accumulator 702, and comparator 707 of inductor current over-current module 700 in FIG. 7. Similarly, inverter 912, logic AND gate 914, and D flip-flop 916 generate falling edge signal CS1_FE in the same manner as their respective counterparts: inverter 720, logic AND gate 718, and inverter 720 of inductor current over-current module 700. Logic OR gate 922 determines the output signal VS_SEL in the same manner as logic OR gate 722.

The over-current protection module 900 also detects the rising edge of switch control signal $CS_1$. Detecting the rising edge of switch control signal $CS_1$ allows over-current protection module 900 to accumulate the difference signal [link voltage signal $V_{LINK}'(n)$ minus input voltage signal $V_X'(n)$] over an entire period, e.g. TT or TT' (FIG. 5), of switch control signal $CS_1$. The inverted latched value Q of switch control signal $CS_1$ by D flip-flop 916 and the current value of switch control signal $CS_1$ are only both logical 1 at the rising edge of switch control signal $CS_1$. Accordingly, rising edge signal CS1_RE is a logical 1 at the rising edge transition of switch control signal $CS_1$ and is otherwise a logical 0.

Referring to FIGS. 5 and 9B, the input voltage accumulator 924 accumulates the link voltage signal $V_{LINK}'(n)$ during each pulse period $t_1^*$ of switch control signal $CS_1$ to generate an output $A(n)_{VLINK\_t1*}$ equal to $V_{LINK}'(n) \cdot t_1^*$ during each inductor flyback period. "$t_1^*$" represents any pulse period of switch control signal $CS_1$ including pulse periods $t_1$ and $t_1'$. The RESET signal is asserted with a logical 1 to pass a logical 0 to accumulator 926 from 2:1 multiplexer 928 and, thus, reset the current accumulator value $A(n)_{VLINK\_t1*}$ of accumulator 926 to 0. The RESET signal is asserted, for example, during initial startup of input voltage accumulator 924. The RESET signal is then set to logical 0 to pass signal Y2(n) to accumulator 926. The current accumulator value $A(n)_{VLINK\_t1*}$ becomes signal Y2(n). After reset, the rising edge signal CS1_RE selects link voltage signal $V_{LINK}'(n)$ as the output of 2:1 multiplexer 932. Thus, the current value of link voltage signal $V_{LINK}'(n)$ becomes the initial value of the current accumulator value $A(n)_{VLINK\_t1*}$ at the beginning of each pulse of switch control signal $CS_1$. During each pulse $t_1^*$ of switch control signal $CS_1$, multiplexers 928 and 930 pass the "link voltage signal $V_{LINK}'(n)$+the previous accumulator value $A(n-1)_{VLINK\_t1*}$" output of adder 934 to become the current accumulator value $A(n)_{VLINK\_t1*}$. During the inductor flyback period when switch control signal $CS_1$ is a logical 0, multiplexers 932, 928, and 930 pass previous accumulator value $A(n-1)_{VX\_t1*}$ to become the current accumulator value $A(n)_{VLINK\_t1*}$. So, during the inductor flyback period, the current accumulator value $A(n)_{VLINK\_t1*}$ is unchanged. Thus, the output of input voltage accumulator 924 during each inductor flyback period $t_1^*$ is $A(n)_{VLINK\_t1*}$, which equals input voltage signal $V_X'(n) \cdot t_1^*$.

The link-input voltage accumulator 936 accumulates the link voltage signal $V_{LINK}'(n)$ to accumulate [the link voltage signal $V_{LINK}'(n)$ minus the input voltage signal $V_X'(n)$ during each period TT* of switch control signal $CS_1$ to generate an output $A(n)_{VLINK\text{-}VX\_TT}$ equal to $[V_{LINK}'(n) - V_X'(n)] \cdot TT^*$. "TT*" represents each period of switch control signal $CS_1$ including periods TT and TT'. The RESET signal is asserted with a logical 1 to pass a logical 0 to accumulator 938 from 2:1 multiplexer 940 and, thus, reset the current accumulator value $A(n)_{VLINK\text{-}VX\_TT*}$ of accumulator 938 to 0. The RESET signal is asserted, for example, during initial startup of link-input voltage accumulator 936. The RESET signal is then set to logical 0 to pass signal Y3(n) to accumulator 926. The current accumulator value $A(n)_{VLINK\_TT*}$ becomes signal Y2(n). After reset, the rising edge signal CS1_RE selects $V_{LINK}'(n) - V_X'(n) + A(n)_{VLINK\_TT*}$ as the output of 2:1 multiplexer 942. "$V_{LINK}'(n) - V_X'(n) + A(n)_{VLINK\text{-}VX\_TT*}$" equals the current value of $V_{LINK}'(n) - V_X'(n)$. Thus, the current value of $V_{LINK}'(n) - V_X'(n)$ becomes the initial value of the current accumulator value $A(n)_{VLINK\text{-}VX\_TT*}$ at the beginning of each pulse of switch control signal $CS_1$. During each period TT* of switch control signal $CS_1$, multiplexers 942 and 940 pass $V_{LINK}'(n) - V_X'(n) + A(n)_{VLINK\text{-}VX\_TT*}$ from the output of adder 944 to become the current accumulator value $A(n)_{VLINK\text{-}VX\_TT*}$. Thus, the output of link-input voltage accumulator 936 during each period TT* of switch control signal $CS_1$ is $A(n)_{VLINK\text{-}VX\_TT*}$, which equals $[V_{LINK}'(n) - V_X'(n)] \cdot TT^*$.

Comparator 946 generates an output signal VTT that is a logical 0 when $V_{LINK}'(n) \cdot t_1^* > \{[V_{LINK}'(n) - V_X'(n)] \cdot TT^*\}$. Output signal VTT is a logical 1 when $\{[V_{LINK}'(n) - V_X'(n)] \cdot TT^*\} > V_{LINK}'(n) \cdot t_1^*$. Output signal VTT selects the output of 2:1 multiplexer 948 as output signal VS_OVR when $V_{LINK}'(n) \cdot t_1^* > \{[V_{LINK}'(n) - V_X'(n)] \cdot TT^*\}$. Output signal VTT selects the output of 2:1 multiplexer 948 as logical 0 when $\{[V_{LINK}'(n) - V_X'(n)] \cdot TT^*\} > V_{LINK}'(n) \cdot t_1^*$. When output signal VS_SEL is a logical 1 indicating that the inductor current $i_L$ (FIG. 4) is above a predetermined threshold, output signal VS_SEL forces multiplexer to output a logical 1. D flip-flop 952 then latches output signal VS_OVR to a logical 1. As previously described with reference to FIG. 8, output signal VS_OVR equal to logical 1 forces switch control signal $CS_1$ to a logical 0. When output signal VTT is a logical 1 and VS_SEL is a logical 0, output signal VS_OVR is a logical 0. An output signal VS_OVR equal to logical 0 allows the pulse width and period signal PWP of DSP 412 to control the state of switch control signal $CS_1$.

The states and interpretation of output signals VTT and VS_SEL are as follows:
(i) VS_SEL=1 when at a falling edge of switch control signal $CS_1$.
(ii) VS_SEL=1 if the current accumulator value $A(n)_{VS\_OVR}$ is greater than the volt-second over-current threshold value $VS_{OVR\_TH}$.
(iii) VS_SEL=0 if (a) switch control signal $CS_1$ is at any state other than a falling edge transition and (b) the current accumulator value $A(n)_{VS\_OVR}$ is less than the volt-second over-current threshold value $VS_{OVR\_TH}$.
(iv) VTT=1 if the inductor flyback period is not over.
(v) VTT=0 if the inductor flyback period is over.
(vi) VS_OVR=1 if VTT or VS_SEL=0 and the pulse width and period signal PWP of DSP 412 controls the state of switch control signal $CS_1$
(vii) VS_OVR=0 if VTT and VS_SEL=1 and switch control signal $CS_1$ is forced to logical 0.

Thus, a controller in a switching power converter based power control system detects an over-current condition of an inductor current using at least one non-inductor-current signal. In at least one embodiment, the switching power converter does not have a resistor or resistor network to sense the inductor current. The controller indirectly determines a state of the inductor current using at least one non-inductor-current signal.

Although the present invention has been described in detail, it should be understood that various changes, substitutions and alterations can be made hereto without departing from the spirit and scope of the invention as defined by the appended claims.

What is claimed is:

1. An apparatus comprising:
 a controller, wherein the controller is configured to:
  detect an over-current condition of an inductor current in a switching power converter using a volt-second value that is representative of an input voltage to the switching power converter and a comparison of the volt-second value to a predetermined threshold value;
  accumulate samples of an input voltage signal received by the controller to determine the volt-second value; and
  determine if an increase in an accumulation of input voltage signal values compared to the predetermined threshold value indicates the over-current condition; and
  during an inductor flyback time, decrement the accumulation of input signal values from an accumulation of link voltage signal samples minus input voltage signal samples taken during the inductor flyback time to determine if the switching power converter is operating in discontinuous conduction mode, wherein a link voltage signal received by the controller represents a link voltage of the switching power converter.

2. The apparatus of claim 1 further comprising:
 the switching power converter, coupled to the controller, wherein the switching power converter includes a reference terminal, an input terminal to receive an input voltage, an inductor coupled to the input terminal, a power regulation switch coupled between the inductor and the reference terminal, a capacitor coupled to the switch, the inductor, and the reference terminal, and an output terminal coupled to the capacitor to provide a link voltage.

3. The apparatus of claim 2 wherein the predetermined threshold value is a predetermined threshold volt-second value and to detect the over-current condition of the inductor current the controller is further configured to measure an accumulation of an input voltage to the switching power converter in volt-second terms and compare the accumulation of the input voltage to a predetermined threshold volt-second value to determine when the over-current condition of the inductor current exists.

4. The apparatus of claim 1 wherein the predetermined threshold value represents a predetermined over-current threshold, the over-current condition occurs when the inductor current reaches the predetermined over-current threshold, and the controller is further configured to protect the switching power converter from the inductor current if a value of the inductor current exceeds the over-current threshold.

5. The apparatus of claim 4 wherein the controller is further configured to protect the switching power converter if the over-current condition occurs by stopping current flow into an inductor if the over-current condition occurs.

6. The apparatus of claim 4 wherein the controller is further configured to (i) stop current flow into an inductor if the over-current condition occurs, (ii) detect operation of the switching power converter in continuous conduction mode and to prevent the inductor from increasing energy storage until after the switching power converter exits continuous conduction mode, and (iii) restart current flow into the inductor when the switching power converter enters discontinuous conduction mode.

7. The apparatus of claim 1 wherein the controller is further configured to detect operation of the switching power converter in continuous conduction mode and to prevent an inductor from increasing energy storage until after the switching power converter exits continuous conduction mode.

8. The apparatus of claim 1 wherein the controller comprises:
 a processor;
 a memory, coupled to the processor, wherein the memory includes code stored therein and executable by the processor to detect the over-current condition and to protect the switching power converter from inductor current if the over-current condition is detected.

9. The apparatus of claim 1 wherein the controller further comprises an over-current protection module, and the over-current protection module includes:
 terminals to receive an input voltage signal and a link voltage signal, wherein the input voltage signal represents the input voltage to the switching power converter and the link voltage signal represents an output voltage of the switching power converter;
 an accumulator to accumulate sample values of the input voltage signal during an ON time of a power regulation switch of the switching power converter; and
 circuitry to:
  determine if an accumulation of the input voltage signal sample values reach an over-current threshold;
  turn the power regulation switch OFF if the accumulation of the input voltage signal sample values reaches the over-current threshold;
  decrement the accumulation of the input voltage signal sample values by an accumulation of samples of the link voltage signal minus an accumulation of input voltage signal samples taken after the power regulation switch is turned OFF to determine if the switching power converter is operating in continuous conduction mode;
prevent the power regulation switch from conducting if the switching power converter is operating in continuous conduction mode; and
cause the power regulation switch to conduct after the circuit detects the switching power converter exiting continuous conduction mode.

10. The apparatus of claim 1 wherein the controller further comprises an over-current protection module, and the over-current protection module includes:
terminals to receive an input voltage signal and a link voltage signal, wherein the input voltage signal represents the input voltage to the switching power converter and the link voltage signal represents an output voltage of the switching power converter;
a first accumulator to accumulate sample values of the input voltage signal during an ON time of a power regulation switch of the switching power converter;
first circuitry to:
determine if an accumulation of the input voltage signal sample values reach an over-current threshold;
turn the power regulation switch OFF if the accumulation of the input voltage signal sample values reaches the over-current threshold;
a second accumulator to accumulate previous values of the accumulation value and sampled differences between the input voltage signal and the link voltage signal to determine if the switching power converter is operating in continuous conduction mode during an OFF time of a power regulation switch of the switching power converter;
second circuitry to:
determine if the switching power converter is operating in continuous conduction mode;
prevent the power regulation switch from conducting if the switching power converter is operating in continuous conduction mode; and
cause the power regulation switch to conduct after the circuit detects the switching power converter exiting continuous conduction mode.

11. The apparatus of claim 1 wherein the switching power converter is a boost-type switching power converter.

12. The apparatus of claim 1 wherein the controller is further configured to provide power factor correction to the switching power converter.

13. The apparatus of claim 1 wherein the predetermined threshold value is a predetermined threshold volt-second value and to detect the over-current condition of the inductor current the controller is further configured to measure an accumulation of the input voltage to the switching power converter in volt-second terms and compare the accumulation of the input voltage to the predetermined threshold volt-second value to determine when the over-current condition of the inductor current exists.

14. A method comprising:
detecting an over-current condition of an inductor current in a switching power converter using a volt-second value that is representative of an input voltage to the switching power converter and a comparison of the volt-second value to a predetermined threshold value;
accumulating a line input voltage to the switching power converter during a period of time when the inductor current is increasing and determine from an accumulation of the line input voltage if the inductor current has reached the over-current condition, wherein the input voltage to the switching power converter is the line input voltage; and
after the period of time when the inductor current is increasing, accumulating a link voltage minus a final line input voltage accumulation value to determine if the switching power converter is operating in discontinuous conduction mode, wherein the final line input voltage accumulation value is the final value of the accumulation of the line input voltage prior to a period of time when the inductor current is decreasing.

15. The method of claim 14 further comprising:
determining if an increase in inductor current associated with an inductor of the switching power converter indicates the over-current condition.

16. The method of claim 14 further comprising providing power factor correction to the switching power converter.

17. The method of claim 14 wherein the predetermined threshold value is a predetermined threshold volt-second value and detecting an over-current condition of an inductor current comprises:
measuring an accumulation of an input voltage to the switching power converter in volt-second terms; and
comparing the accumulation of the input voltage to a predetermined threshold volt-second value to determine when the over-current condition of the inductor current exists.

18. The method of claim 14 wherein the predetermined threshold value is a predetermined over-current threshold, and the over-current condition occurs when the inductor current reaches the predetermined over-current threshold, the method further comprising:
protecting the switching power converter from the inductor current if a value of the inductor current exceeds the over-current threshold.

19. The method of claim 18 further comprising:
protecting the switching power converter if the over-current condition occurs by stopping current flow into an inductor if the over-current condition occurs.

20. The method of claim 18 further comprising:
detecting operation of the switching power converter in continuous conduction mode and to prevent an inductor from increasing energy storage until after the switching power converter exits continuous conduction mode.

21. The method of claim 18 further comprising:
stopping current flow into the inductor if the over-current condition occurs;
detecting operation of the switching power converter in continuous conduction mode and to prevent an inductor from increasing energy storage until after the switching power converter exits continuous conduction mode; and
restarting current flow into the inductor when the switching power converter enters discontinuous conduction mode.

22. The method of claim 14 wherein an input voltage signal represents the input voltage to the switching power converter and a link voltage signal represents an output voltage of the switching power converter, the method further comprising:
accumulating the input voltage signal during an ON time of a power regulation switch of the switching power converter;
determining if an accumulation value of the input voltage signal reaches an over-current threshold;
turning the power regulation switch OFF if the accumulation value of the input voltage signal reaches the over-current threshold;
decrementing sampled differences between the input voltage signal and the link voltage signal from a final accumulation value of the input signal to determine if the switching power converter is operating in continuous conduction mode;

preventing the power regulation switch from conducting if the switching power converter is operating in continuous conduction mode; and causing the power regulation switch to conduct after the circuit detects the switching power converter exiting continuous conduction mode.

23. The method of claim 14 wherein the switching power converter is a boost-type switching power converter.

24. A method comprising:

detecting an over-current condition of an inductor current in a switching power converter using a volt-second value that is representative of an input voltage to the switching power converter and a comparison of the volt-second value to a predetermined threshold value, wherein an input voltage signal represents the input voltage to the switching power converter and a link voltage signal represents an output voltage of the switching power converter;

accumulating the input voltage signal during an ON time of a power regulation switch of the switching power converter;

determining if an accumulation value of the input voltage signal reaches an over-current threshold;

turning the power regulation switch OFF if the accumulation value of the input voltage signal reaches the over-current threshold;

accumulating previous values of the accumulation value and sampled differences between the input voltage signal and the link voltage signal to determine if the switching power converter is operating in continuous conduction mode;

preventing the power regulation switch from conducting if the switching power converter is operating in continuous conduction mode; and causing the power regulation switch to conduct after the circuit detects the switching power converter exiting continuous conduction mode.

* * * * *